(12) United States Patent
Ushiwata et al.

(10) Patent No.: US 7,905,167 B2
(45) Date of Patent: Mar. 15, 2011

(54) MITER SAW

(75) Inventors: Shigeharu Ushiwata, Hitachinaka (JP);
Hideaki Terashima, Hitachinaka (JP);
Ryuichi Imamura, Hitachinaka (JP);
Toshihiko Hayashizaki, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 865 days.

(21) Appl. No.: 11/334,452

(22) Filed: Jan. 19, 2006

(65) Prior Publication Data
US 2006/0156888 A1 Jul. 20, 2006

(30) Foreign Application Priority Data
Jan. 20, 2005 (JP) .................. P2005-012609

(51) Int. Cl.
*B26D 5/08* (2006.01)
*B26D 5/00* (2006.01)
*B26D 1/18* (2006.01)
*B27B 5/00* (2006.01)

(52) U.S. Cl. ............. 83/581; 83/397; 83/490; 83/471.3; 83/489

(58) Field of Classification Search ............ 83/483, 83/484, 485, 486, 487, 488, 489, 471.3, 473, 83/490, 471
See application file for complete search history.

(56) References Cited

U.S. PATENT DOCUMENTS

| | | | | |
|---|---|---|---|---|
| 1,852,387 A * | 4/1932 | Wieden | ................ | 83/471.3 |
| 2,312,356 A * | 3/1943 | Ocenasek | ................ | 83/486.1 |
| 2,353,088 A * | 7/1944 | Schutz | ................ | 384/55 |
| 4,869,142 A * | 9/1989 | Sato et al. | ................ | 83/467.1 |
| 4,958,544 A * | 9/1990 | Miyamoto | ................ | 83/471.3 |
| 5,239,906 A * | 8/1993 | Garuglieri | ................ | 83/471.3 |
| 5,957,021 A | 9/1999 | Meredith et al. | | |
| 6,016,732 A | 1/2000 | Brault et al. | | |
| 6,170,373 B1 * | 1/2001 | Sasaki et al. | ................ | 83/485 |
| 6,425,309 B1 * | 7/2002 | Stumpf et al. | ................ | 83/468.2 |
| 6,470,778 B1 * | 10/2002 | Kaye et al. | ................ | 83/100 |
| 6,763,751 B2 * | 7/2004 | Judge | ................ | 83/471.3 |
| 6,971,297 B1 * | 12/2005 | Meredith et al. | ................ | 83/478 |
| 7,171,879 B2 * | 2/2007 | Gass et al. | ................ | 83/58 |
| 2004/0060407 A1 * | 4/2004 | Kao | ................ | 83/397 |
| 2005/0098010 A1 * | 5/2005 | Hu | ................ | 83/471.2 |
| 2005/0235791 A1 * | 10/2005 | Ushiwata et al. | ................ | 83/167 |
| 2006/0005676 A1 * | 1/2006 | Terashima et al. | ................ | 83/471.3 |

(Continued)

FOREIGN PATENT DOCUMENTS

CA 2 372 451 8/2003

(Continued)

*Primary Examiner* — Ghassem Alie
*Assistant Examiner* — Bharat C Patel
(74) *Attorney, Agent, or Firm* — Antonelli, Terry, Stout & Kraus, LLP.

(57) ABSTRACT

A miter saw which prevents deterioration in perpendicularity of a cutting blade to the upper surface of a base part when slide of a pipe is regulated by pressing a pipe. In a miter saw, a pair of pipes support a cutting part, on one end side. On the other end side, the pipes are surrounded and supported slidably by a first slide support part of a support member of a turntable. A virtual plane including the axes of the pair of pipes is substantially parallel to the pivotal direction of a disc saw blade. A first screw is screwed in the first slide support part. An end part of the first screw contacts and presses a pipe. This end part is engaged with the pipe so as to restrict slide of the pipe relative to the first slide support part.

2 Claims, 15 Drawing Sheets

U.S. PATENT DOCUMENTS

2006/0266186 A1* 11/2006 Ozawa et al. .................. 83/473
2007/0157782 A1* 7/2007 Hetcher et al. ............... 83/471.3

FOREIGN PATENT DOCUMENTS

| | | |
|---|---|---|
| JP | 61-27623 | 2/1986 |
| JP | 62-11526 | 1/1987 |
| JP | 62-162001 | 10/1987 |
| JP | 6-71602 | 3/1994 |
| JP | 6-297402 | 10/1994 |
| JP | 08-336802 | 12/1996 |
| JP | 9-164504 | 6/1997 |
| JP | 11-090730 | 4/1999 |
| JP | 11-170202 | 6/1999 |
| JP | 2000-225603 | 8/2000 |
| JP | 2003-145501 | 5/2003 |

* cited by examiner

MITER SAW

BACKGROUND OF THE INVENTION

1. Technical Field

The present invention relates to a miter saw. In particular, the present invention relates to a miter saw having a slidable part which allows a cutting blade to be slidable in a direction substantially perpendicular to a pivot shaft of the cutting blade.

2. Related Art

Japanese Patent Application Publication Hei 8-336802 discloses a miter saw having a base part, a cutting part, and a support member. A material-to-be-cut can be placed on the base part. The cutting part rotatably supports a disc saw blade. The support member supports the cutting part, to be able to swing about a pivotal shaft as a fulcrum, the pivotal shaft being substantially parallel to the rotation axis of the disc saw blade. The support member and the base part are connected to each other, with the support member and the side faces of the disc saw blade being tiltable relative to the upper surface of the base part.

In a miter saw having the structure as described above, the support member has an end supported on the base part, and has a slide support part on another end. The miter saw also includes a slide part which is slidably supported by the slide support part and is movable in a direction substantially perpendicular to the pivotal shaft. As the slide part moves, the cutting blade moves in the direction substantially perpendicular to the pivotal shaft. This miter saw is arranged as follows. A workpiece is placed on the upper surface of the base part, and then can be cut by moving the cutting blade in the direction substantially perpendicular to the pivotal shaft.

The slide part has a pair of pipes. The pipes support, the cutting part on one end side. The slide support part slidably supports the other end side of the pipes. As shown in FIG. 22, the pair of pipes 1050 and 1051 are positioned in parallel with each other. A virtual plane including axes of the pair of pipes 1050 and 1051 is substantially perpendicular to the swing direction of the cutting blade 1060. In other words, the vertical plane is substantially parallel to the pivotal shaft of the cutting blade 1060. In FIG. 22, the pivotal shaft is oriented in the horizontal direction of this figure. This miter saw is structured as follows. The pair of pipes 1050 and 1051 slide relative to the slide support part 1049 of a holding part in a direction perpendicular to the paper sheet of FIG. 22. Accordingly, the cutting blade moves in a direction substantially perpendicular to the pivotal shaft of the cutting blade 1060.

The slide support part 1049 supporting the pipe 1050 is provided with an engagement member which regulates slide of the pipe 1050. The engagement member has a screw 1054 and a knob 1054A provided on an end of the screw 1054. The pair of pipes 1050 and 1051 are held by and covered circumferentially by the slide support part 1049. A through hole 1049d is formed in the slide support part 1049. A through hole 1049d penetrates in a direction substantially perpendicular to the virtual plane including the axes of the pair of pipes 1050 and 1051. The screw 1054 is screwed in the through hole 1049d. As the other end of the screw 1054 presses the pipe 1050 in the direction perpendicular to the virtual plane, slide of the pipe 1050 can be regulated.

However, in the conventional miter saw, one pipe 1050 is warped since the pipe 1050 is pressed by the screw 1054. The slide support part 1049 rotates about the other pipe 1051 as a fulcrum, thereby varying the direction of the side faces of the cutting blade. The perpendicularity to the upper surface of the base part therefore deteriorates.

SUMMARY OF THE INVENTION

An object of the present invention is to provide a miter saw which prevents deterioration in perpendicularity of the cutting blade to the upper surface of the base part when slide of a pipe is regulated by pressing the pipe.

The present invention provides a miter saw having: a base portion, a support member, and a cutting portion. The base portion supports a workpiece. The support member is supported by the base portion. The cutting portion has a pivotal shaft. The cutting portion is pivotably supported by the support member about the pivotal shaft. The cutting portion has a circular saw blade to be pivotably moved to cut the workpiece. The support member includes a first slide support portion provided at a top end thereof, and a pair of pipes supported slidably by the first slide support portion to be movable in a direction perpendicular to the pivotal shaft. The pair of pipes pivotably supports the cutting portion. The pair of pipes each have a longitudinal axis and are parallel to each other. The longitudinal axes of the pair of pipes are positioned so as to define a virtual plane which is parallel to a pivotal direction of the circular saw blade. The first slide support portion includes a first engagement member that is contactable with one of the pair of pipes to press the one of the pair of pipes in a pressing direction lying on the virtual plane, thereby restricting a slide of the pair of pipes relative to the first slide support portion.

The present invention provides a miter saw having: a base portion, a support member, and a cutting portion. The base portion supports a workpiece. The support member is supported by the base portion. The cutting portion has a pivotal shaft. The cutting portion is pivotably supported by the support member about the pivotal shaft. The cutting portion has a circular saw blade to be pivotably moved to cut workpiece. The support member supports a pair of pipes which is parallel to each other. The pair of pipes supports the cutting portion. The pair of pipes each have a longitudinal axis. The pair of pipes are positioned so that the longitudinal axes of the pair of pipes define a virtual plane which is parallel to a pivotal direction of the circular saw blade. The cutting portion includes a slide support portion which supports the circular saw blade. The slide support portion is slidable along the pair of pipes. The slide support portion includes an engagement member that is contactable with one of the pair of pipes to press the one of the pair of pipes in a pressing direction lying on the virtual plane, thereby restricting a slide of the pair of pipes relative to the slide support portion.

The present invention provides a miter saw having: a base portion, a cutting portion, a pair of pipes, and a fixing member. The base portion supports a workpiece. The cutting portion is positioned above the base portion. The cutting portion rotatably supports a circular saw blade, and is pivotally movable with respect to the base portion in a pivot direction to cut the workpiece. The circular saw blade has a rotation axis and a side surface which is perpendicular to the rotation axis. The cutting portion is slidable with respect to the base portion along a direction which is parallel to the side surface. The pair of pipes provides sliding movement of the cutting portion. Each of the pair of pipes has a longitudinal axis. The pair of pipes defines a virtual plane including the longitudinal axes and extending parallel to the pivot direction. The fixing member imparts a pressing force to one of the pair of pipes to restrict the sliding movement of the cutting portion. The pressing force lies in the virtual plane.

BRIEF DESCRIPTION OF THE DRAWINGS

The aforementioned aspects and other features of the invention are explained in the following description, taken in connection with the accompanying drawing figures wherein.

DESCRIPTION OF THE EMBODIMENTS

A miter saw according to an embodiment of the present invention will be described with reference to FIGS. 1 to 19. In the description below, the expression "front", "rear", "left", "right", "upper", and "lower" are used throughout the description to define various parts when a miter saw is disposed in an orientation in which it is intended to be used.

Figure 1:
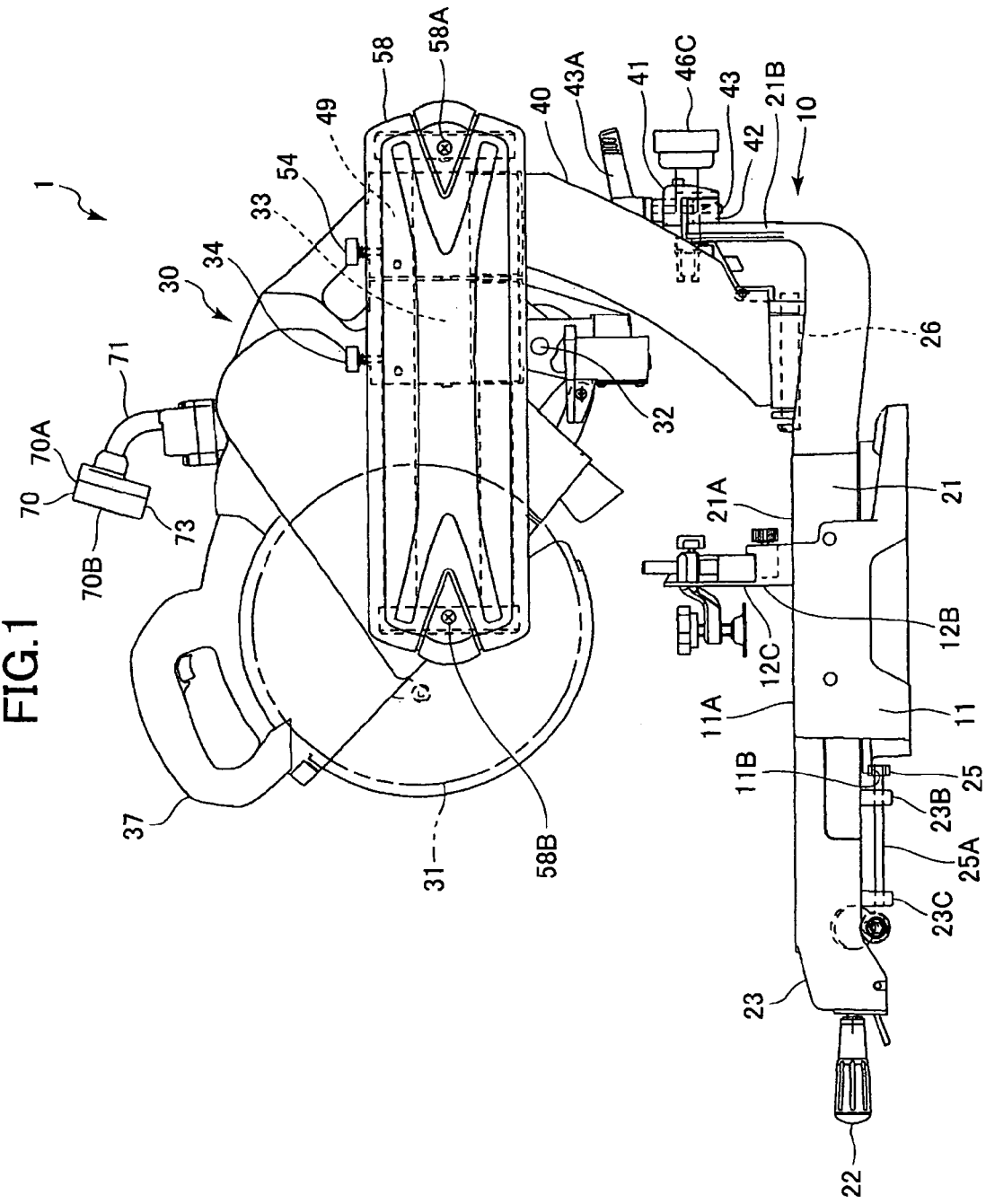
FIG. 1 is a right side view showing the miter saw according to an embodiment of the present invention.

As shown FIG. 1, a miter saw 1 is a table disc saw having a base part 10, a cutting part 30, and a support member 40. The base part 10 is capable of supporting a workpiece which is a quadrangular columnar wood. The cutting part 30 has a motor (not shown) and a disc saw blade 31, and rotatably supports the disc saw blade 31 rotated and driven by the motor. The support member 40 is supported tiltably by the base part 10. The support member 40 supports the cutting part 30 above the base part 10 to be pivotably moved.

The base part 10 includes a base 11 to be placed on a floor, and a turntable 21 which is supported by the base 11 to be horizontally rotated on the base 11. The rotated angle of the turntable 21 relative to the base 11 is called a pivot angle. An upper surface 11A of the base 11 and an upper surface 21A of the turntable 21 are flush with each other. The workpiece carried on these upper surfaces 11A and 21A is cut by the disc saw blade 31. An arc part forming an arc-like shape along the pivotable direction of the turntable 21 is provided integrally with the base 11. Also, a pair of left and right fences 12A and 12B (FIG. 3) standing on the upper surface 11A of the base 11 are provided on the base 11. The faces of the fences 12A and 12B oriented to the front side of the miter saw 1 form a press face 12C. A surface of workpiece is brought into contact with the press face 12C, thereby stably supporting the workpiece. Accordingly, cutting work can be carried out stably.

Figure 13:
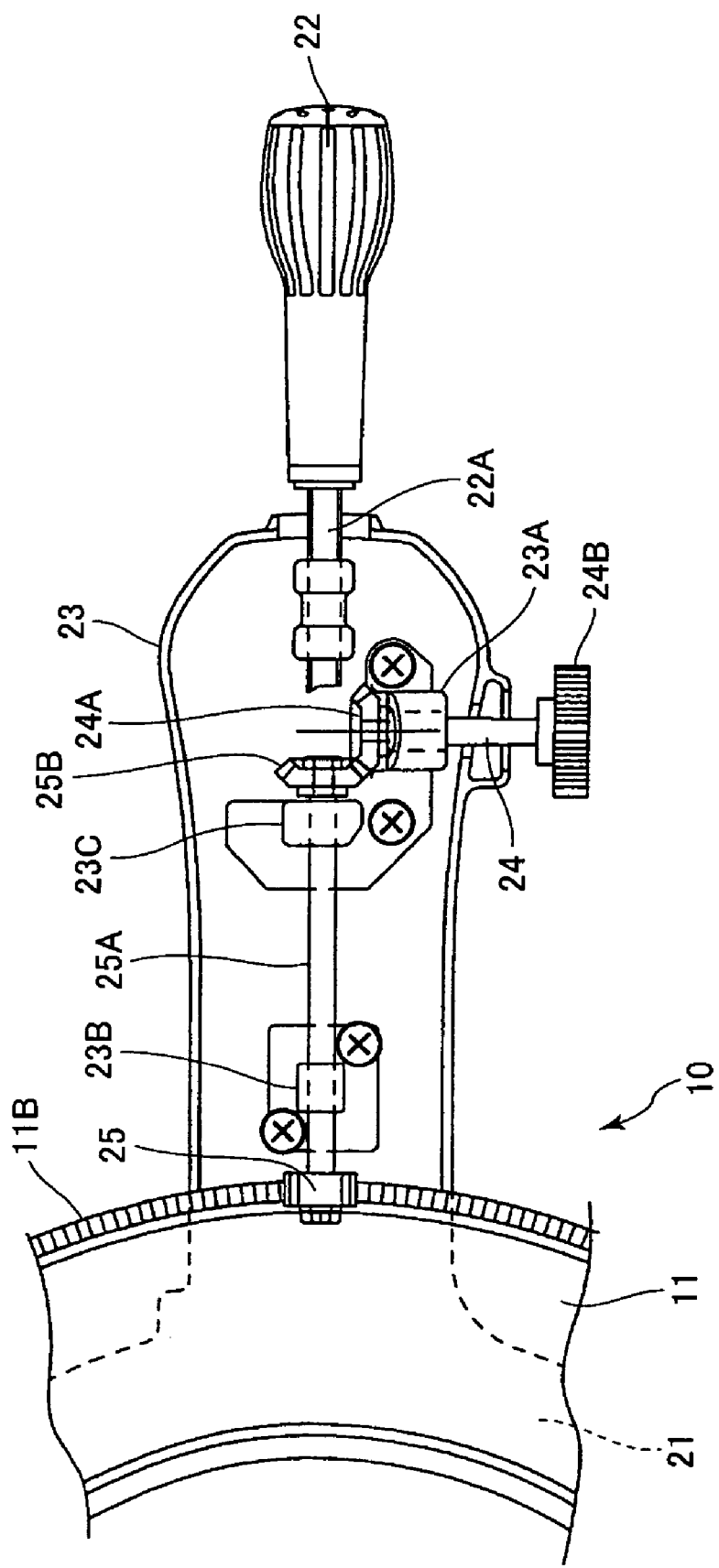
FIG. 13 is a bottom view showing a pivot fine-adjustment device of the miter saw.

As shown in FIG. 13, the turntable 21 is provided with a knob 22, as shown in FIG. 1. The knob 22 is provided extending in parallel with the upper surface 11A of the base 11 and the upper surface 21A of the turntable 21 outwards in the radial direction of the turntable 21. The knob 22 is provided at an end of the knob shaft 22A. A male screw (not shown) is provided on the knob shaft 22A. On the other side, the turntable 21 is provided with a frame 23 extending outwards in the radial direction of the turntable 21, in parallel with the knob shaft 22A. The frame 23 is provided with a knob shaft reception part in which a female screw is formed. The male screw of the knob shaft 22A is screwed in the knob shaft reception part, and is received such that the knob shaft 22A can be screwed back (or out) and forth (or in) in the radial direction of the turntable 21, relative to the frame 23.

The knob 22 is screwed in the radial direction of the turntable 21, to make a second end of the knob shaft 22A contact and pressed against the arc part integrally provided on the base 11. The second end of the knob shaft 22A is opposite to the end of thereof which is provided with the knob 22. In this manner, pivoting of the turntable 21 can be regulated. From this state in which pivoting of the turntable 21 is regulated, the knob 22 is screwed out outwards in the radial direction of the turntable 21, to make the second end of the knob shaft 22A apart from the arc part of the base 11. In this manner, the turntable 21 can be pivoted. When an operator of the miter saw 1 operates the turntable 21 to pivot, the operator pivots the turntable 21, while gripping the knob 22. Then, the knob 22, frame 23, and turntable 21 are pivoted integrally.

The base part 10 is provided with a pivot-angle adjustment device to make fine adjustment of the pivot position of the turntable 21. The pivot-angle adjustment device includes a tooth part 11B, a knob 24, and a pinion 25, as shown in FIG. 13. The tooth part 11B is constituted by a rack provided substantially like an arc on a peripheral part on the lower face of the base 11 along the pivot direction of the turntable 21. The knob 24 is received rotatably by the frame 23 of the turntable 21. The pinion 25 is also received rotatably by the frame 23 of the turntable 21. The knob 24 has a bevel gear 24A on one end and a knob part 24B on the other end. The knob 24 is bore rotatably by the frame 23 by means of the bearing 23A provided on the frame 23.

The pinion 25 is fixed to an end of the pinion shaft 25A, to be rotatable coaxially with the pinion shaft 25A. To the other end of the pinion shaft 25A, a bevel gear 25B is fixed to be rotatable coaxially with the pinion shaft 25A. The pinion shaft 25A is oriented in the radial direction of the turntable 21 while the rotation shaft of the knob 24 is oriented in a direction perpendicular to the pinion shaft 25A. The bevel gear 25b of the pinion shaft 25A is constantly screwed with the bevel gear 24A of the knob 24. The pinion 25 is constructed such that the pinion 25 always rotates whenever the knob 24 rotates. The both ends of the pinion shaft 25A are respectively received by the bearings 23B and 23C, thereby preventing the position of the rotation axis of the pinion shaft 25A from changing while the pinion shaft 25A is rotating.

The pinion 25 is constantly toothed with the tooth part 11B, as shown in FIG. 13. The tooth part 11B is provided integrally with the base 11. Therefore, as the knob 24 is rotated, the pinion 25 rotates integrally with the pinion shaft 25A. However, the tooth part 11B does not pivot since the tooth part 11B is integral with the base 11. At this time, the turntable 21 is pivoted relatively. Thus, the knob 24 can be rotated in conjunction with pivoting of the turntable 21 relative to the base 11. By rotating the knob 24, the pivot angle of the turntable 21 can be adjusted.

Figure 7:
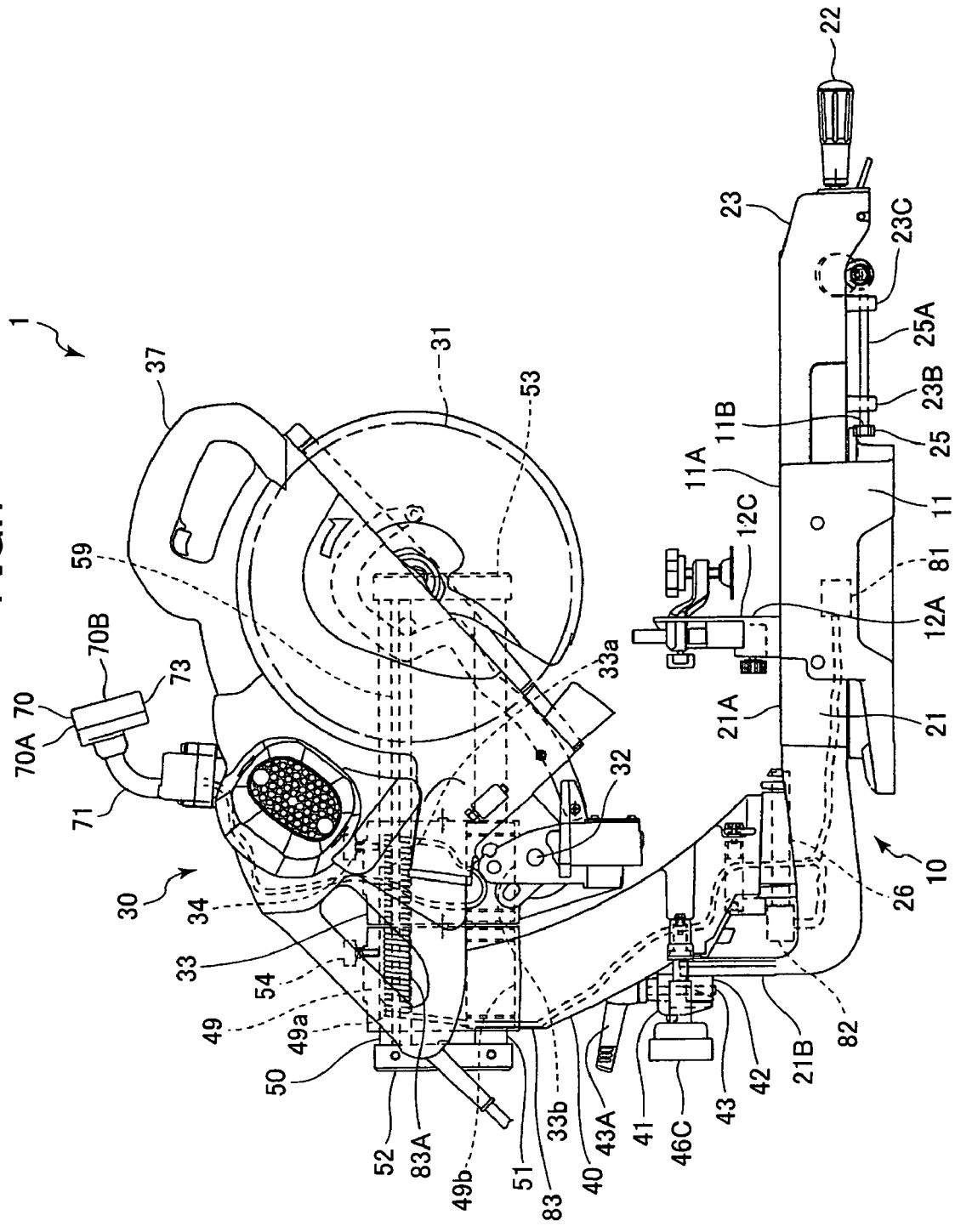
FIG. 7 is a left side view showing a state where the cutting part of the miter saw is positioned at the backmost position and a pair of pipes do not project to the rear side of the miter saw.

Also, the base part 10 is provided with a pivot angle detection unit 81 (FIG. 7). A potentiometer is used as the pivot angle detection unit 81. The pivot angle detection unit 81 is provided at the rotation axis position of the turntable 21. The pivot angle detection unit 81 has a rotation shaft rotatable relative to the body of the pivot angle detection unit 81. An end of the rotation shaft is fixed to the base 11. On the base 11, as the turntable 21 rotates about the rotation shaft relative to the base 11, the pivot angle detection unit 81 rotates, and the voltage value of an output from the pivot angle detection unit 81 to a microcomputer described later varies linearly. Since the voltage value varies linearly, the pivot angle detection unit 81 can detect a rotation amount of the turntable 21 relative to the base 11.

As shown in FIG. 1, the support member 40 is provided at a rear end part of the turntable 21. The support member 40 stands substantially perpendicularly on the turntable 21, and is pivotable integrally with the turntable 21. The support member 40 is supported by a tilt shaft 26 to be tiltable integrally with the cutting part 30 in the rightward and leftward directions of FIG. 3. The tilt shaft 26 is fixed to the turntable 21 and extends in frontward and rearward directions. Therefore, the tilt angle of the support member 40 relative to the upper surface 21A of the turntable 21 and the tilt angle of the side faces of the disc saw blade 31 of the cutting part 30 are identical to each other. The angle of the support member 40 relative to the upper surface 11A of the base 11, i.e., the angle of the side faces of the disc saw blade 31 relative to the upper surface 11A of the base 11 is called a tilt angle. The support member 40 can lock tilting in the rightward and leftward directions by means of a clamp mechanism described below.

As shown in FIG. 1, a protruding part 21B standing perpendicularly is provided at a rear end part of the turntable 21, integrally with the turntable 21. A part of the protruding part 21B is covered by a convex part 41 from upside. The convex part 41 extends rearwards from the support member 40 on the rear end face of the support member 40 and is formed integrally with the support member 40. A wedge-like slider 42 is provided between the protruding part 21B of the turntable 21 and the convex part 41 of the support member 40. A clamp bolt 43 inserted vertically from above into the convex part 41 of the support member 40 is screwed in the slider 42. In this case, a clamp lever 43A is integrally fixed to the upper end of the clamp bolt 43. The slider 42 is constantly urged downwards, i.e., in the unclamping direction by a not-shown spring.

When the clamp lever 43A is rotated in a loosening direction, the clamp bolt 43 rotates together with the clamp lever 43A, moving down the slider 42. As a result, the support member 40 clamped by the slider 42 is released, to make the support member 40 tiltable right and left about the tilt shaft 26 as a center. When the clamp lever 43A is rotated in a tightening direction, the clamp bolt 43 is rotated in an opposite direction to the former direction, to raise the slider 42 against the elastic force of the spring. As a result, the slider 42 enters between the protruding part 21B of the turntable 21 and the convex part 41 of the support member 40. Due to a wedge effect, the slider 42 presses the convex part 41 of the support member 40 rearwards and clamps the convex part 41. In this manner, tilting of the support member 40 is locked and disabled.

Figure 3:
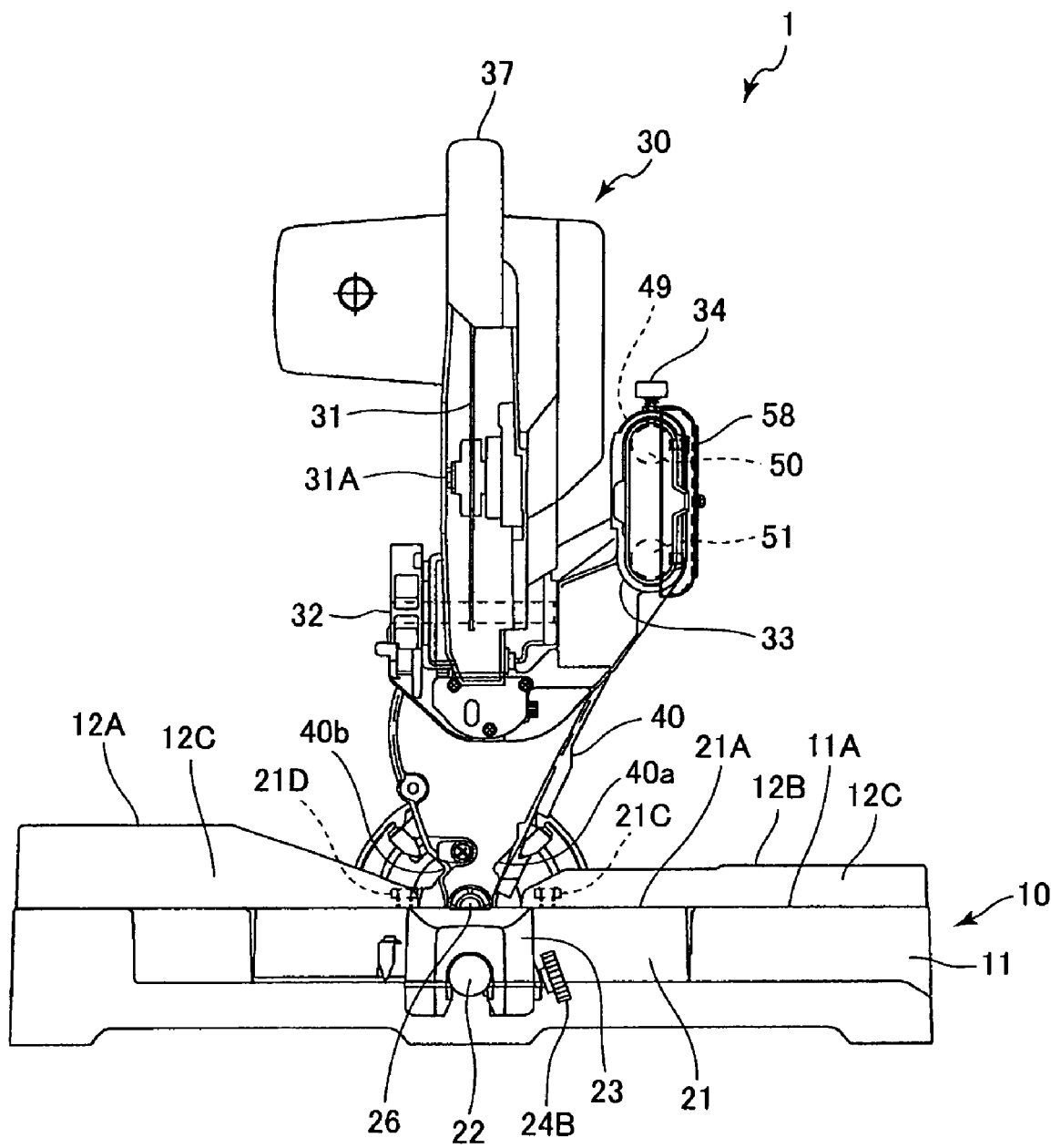
FIG. 3 is a front view showing the miter saw shown in FIG. 1.

Meanwhile, as shown in FIG. 3, stoppers 40a and 40b to regulate the inclination angle of the support member 40 are provided at a base end part of the support member 40 which is close to the base part 10. On the other side, stopper bolts 21C and 21D are screwed at positions on the movement loci of the stoppers 40a and 40b on the upper surface 21A of the turntable 21, depending on tilting of the support member 40. According to this structure, as the cutting part 30 together with the support member 40 is tilted right and left about the tilt shaft 26 as a center, the stoppers 40a and 40b respectively contact head parts of the stopper bolts 21C and 21D at a predetermined inclination angle. Accordingly, the inclination angle of the support member 40 and the cutting part 30 is regulated.

Figure 11:
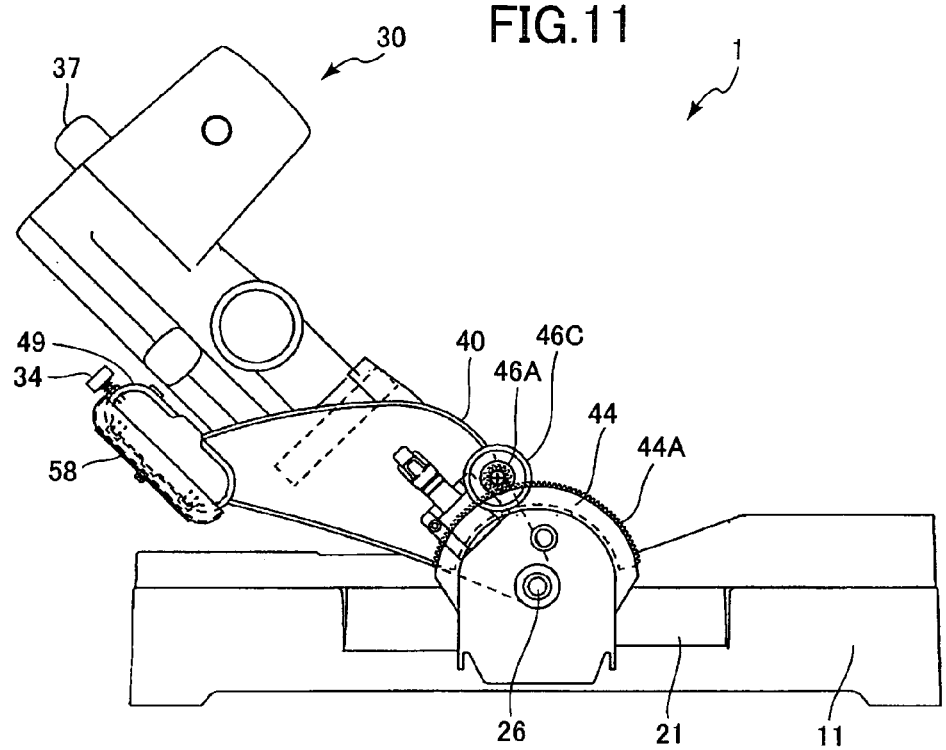
FIG. 11 is a conceptual rear view showing the tilt fine-adjustment device where the miter saw is tilted most to the right side.
Figure 12:
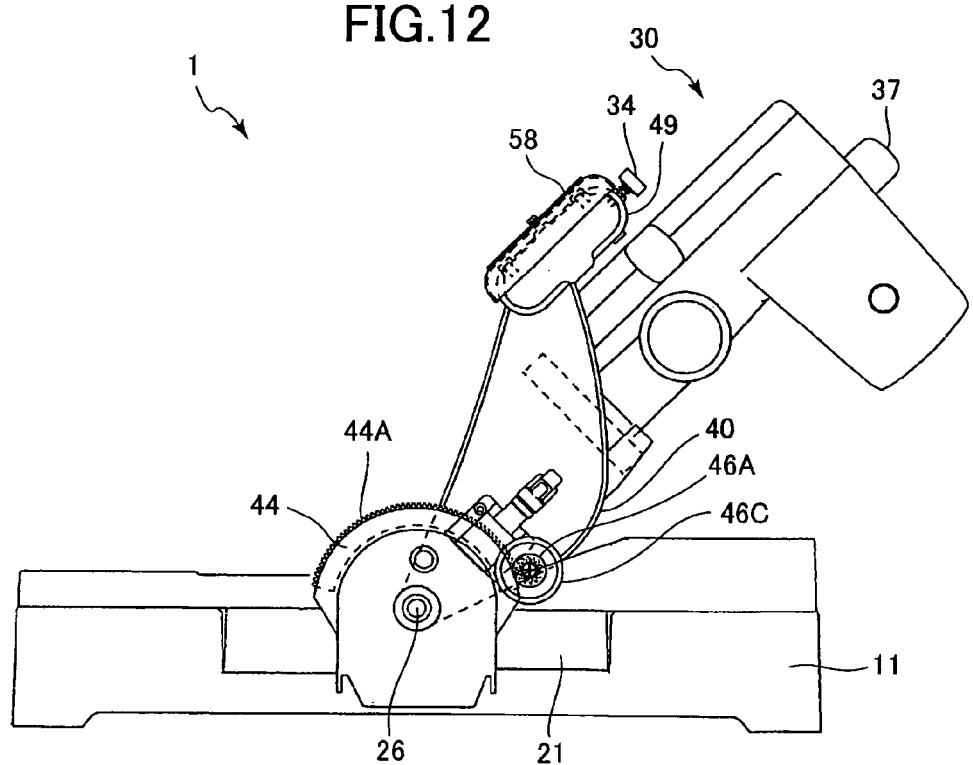
FIG. 12 is a conceptual rear view showing the tilt fine-adjustment device where the miter saw is tilted most to the left side.

With the above structure, when the support member 40 and the cutting part 30 are inclined by 45° in the rightward direction, the stopper 40a contacts the head part of the stopper bolt 21C. When the support member 40 and the cutting part 30 are inclined by 45° in the leftward direction, the stopper 40b contacts the head part of the stopper bolt 21D. Thus, the support member 40 and cutting part 30 can be inclined, at most, to 45° in each of rightward and leftward directions about the tilt shaft 26 as a center, as shown in FIGS. 11 and 12.

The turntable 21 is also provided with a tilt angle detection unit 82 (FIG. 7). A potentiometer is used as the tilt angle detection unit 82. The tilt angle detection unit 82 is provided on one end side of the tilt shaft 26 fixed to the turntable 21. The tilt angle detection unit 82 has a rotation shaft rotatable relative to the body of the tilt angle detection unit 82. The body is fixed to the support member 40, and an end of the rotation shaft is fixed to the tilt shaft 26 which rotates relative to the support member 40. When the support member 40 is rotated relative to the turntable 21 about the tilt shaft 26, the rotation shaft of the tilt angle detection unit 82 rotates relative to the support member 40. The voltage value of an output of the tilt angle detection unit 82 is inputted to a microcomputer described later thereby changing linearly. Since the voltage value changes linearly, the tilt angle detection unit 82 can detect the tilt amount of the support member 40 relative to the upper surface 21A of the turntable 21.

Figure 9:
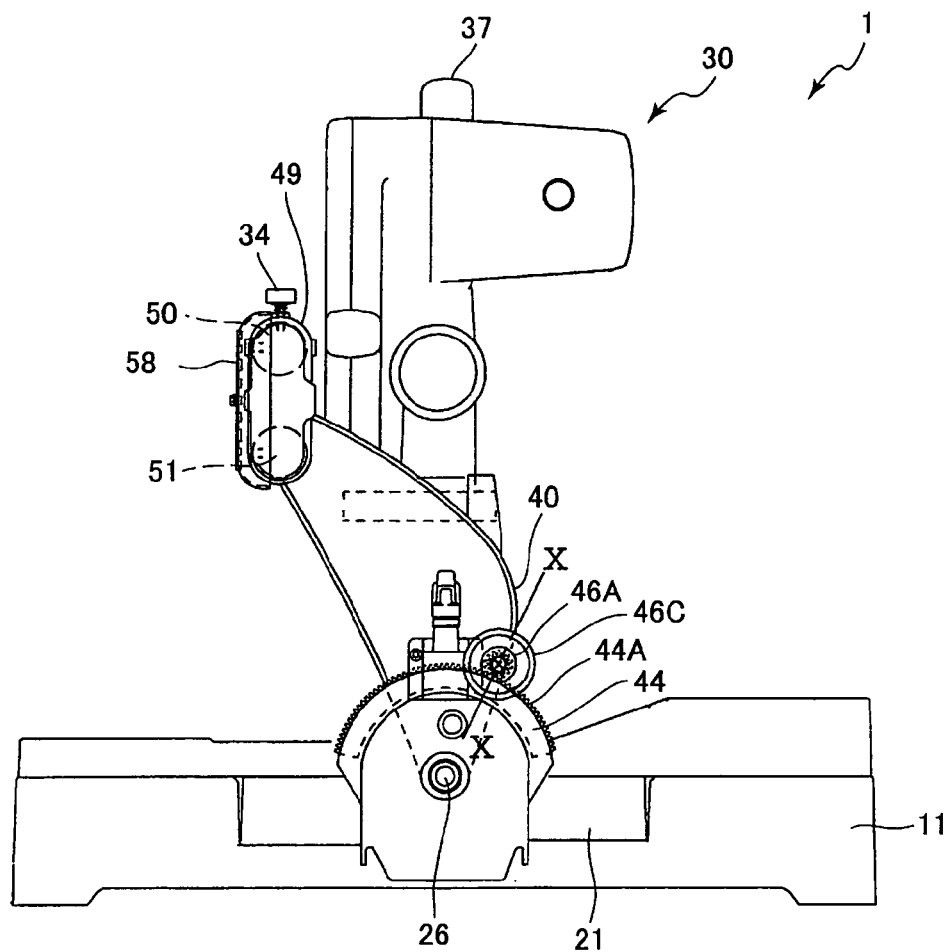
FIG. 9 is a conceptual rear view showing a tilt fine-adjustment device of the miter saw.
Figure 10:
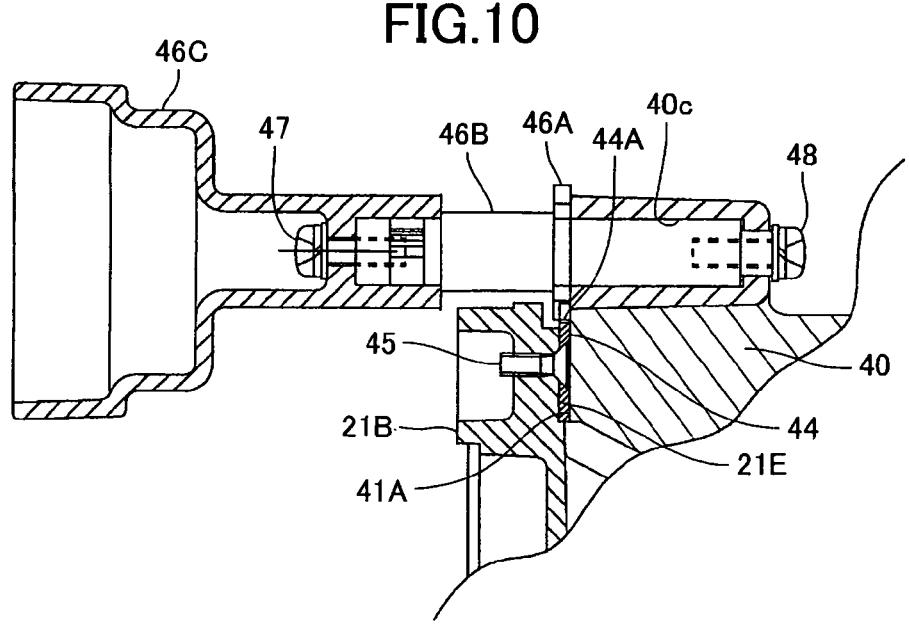
FIG. 10 is a cross-sectional view showing a major part of the tilt fine-adjustment device of the miter saw.

A part of the protruding part 21B of the turntable 21 and a part of the support member 40 have a first opposing part 21E and a second opposing part 41A which are planes opposed to each other respectively, as shown in FIG. 10. The protruding part 21B of the turntable 21 and the support member 40 each are made of aluminum. Therefore, the first opposing part 21E and second opposing part 41A are also made of aluminum. As shown in FIGS. 9, 11, and 12, a substantially plate-like tooth member 44 is fixed to the first opposing part 21E by a bias 45 (FIG. 10). As shown in FIGS. 11 and 12, the tooth member 44 is formed like an arc along the tilt direction in which the second opposing part 41A tilts as the support member 40 tilts. At a peripheral part of the tooth member 44, teeth 44A forming a rack are formed like an arc. The second opposing part 41A slides on the tooth member 44 as the support member 40 tilts. The tooth member 44 is made from iron. Therefore, the tooth member 44 prevents both of the first opposing part 21E and second opposing part 41A made from aluminum from directly sliding on and roughing surfaces thereof. Thus, sliding of the second opposing part 41A on the tooth member 44 can thus be smoothened. The tooth member 44 is about 2 mm thick in the rightward and leftward directions of the FIG. 10.

At positions the near the second opposing part 41A in a part on the left face of the support member 40, a pinion 46A, a knob 46C, and a shaft part 46B are provided, as shown in FIG. 10. To an end of the shaft part 46B, the pinion 46A is fixed to be rotatable coaxially and integrally with the shaft part 46B. To the other end of the shaft part 46B, the knob 46C is fixed to be rotatable coaxially and integrally with the shaft part 46B by a screw 47. The shaft part 46B is inserted in a hole 40c which formed at a part on the left side face of the support member 40 and oriented in frontward and rearward directions. The shaft part 46B is held by a screw 48, thereby rotatably being supported by the support member 40. The pinion 46A is constantly toothed with the teeth 44A of the tooth member 44. Therefore, the structure is arranged such that the knob 46C rotates as the support member 40 tilts together with the cutting part 30. Inversely, as the knob 46C is rotated, the pinion 46A rotates integrally with the knob 46C. Accordingly, with the second opposing part 41A sliding on the tooth member 44, the support member 40 and the cutting part 30 tilt relative to the turntable 21. The tilt angle can thus be finely adjusted.

Also as described above, the pinion 46A is fixed to an end of the shaft part 46B, coaxially with the shaft part 46B, and the knob 46C is fixed to the other end of the shaft part 46B, coaxially with the shaft part 46B. Therefore, a structure to make fine adjustment of the tilt angle can be simplified.

Figure 2:
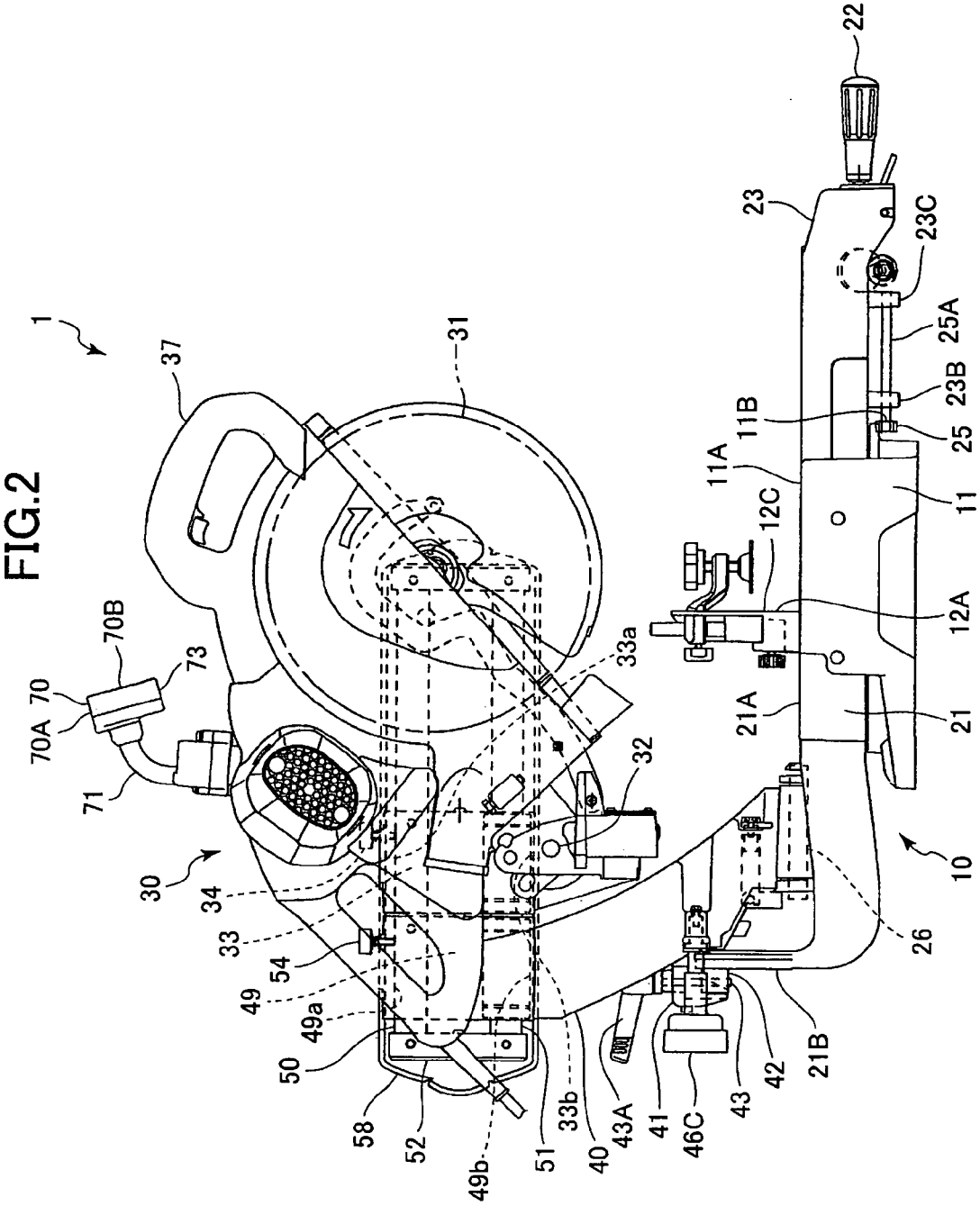
FIG. 2 is a left side view showing the miter saw shown in FIG. 1.
Figure 14:
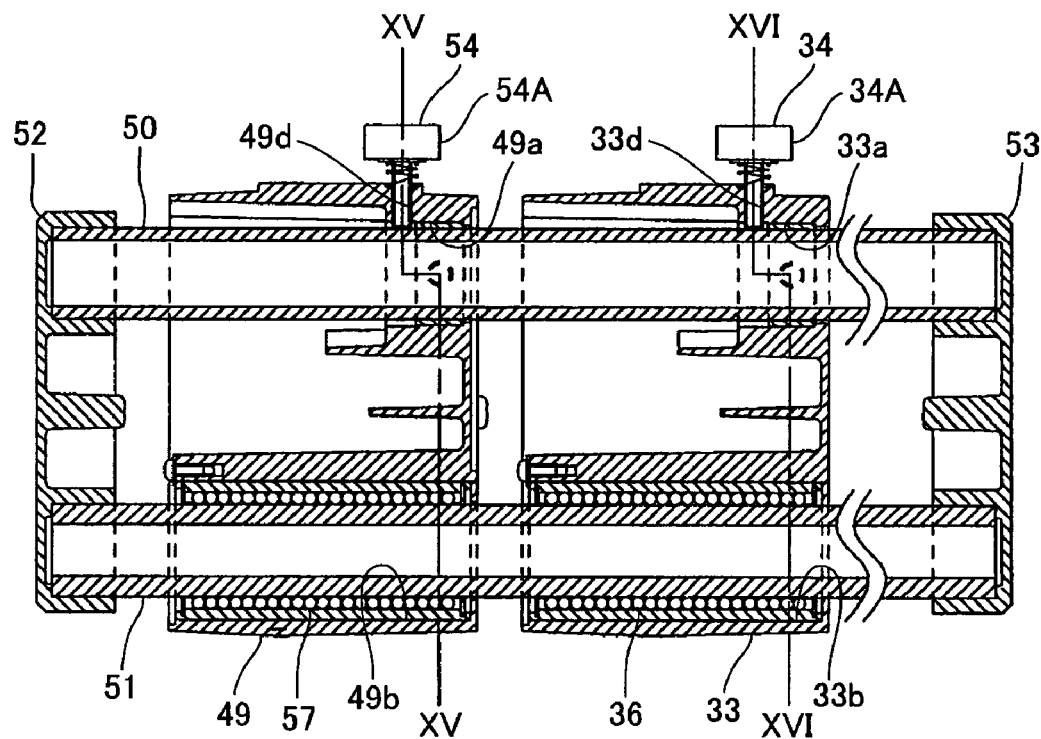
FIG. 14 is a cross-sectional view showing a pair of pipes to move the cutting part of the miter saw in a direction substantially perpendicular to a pivot shaft.
Figure 15:
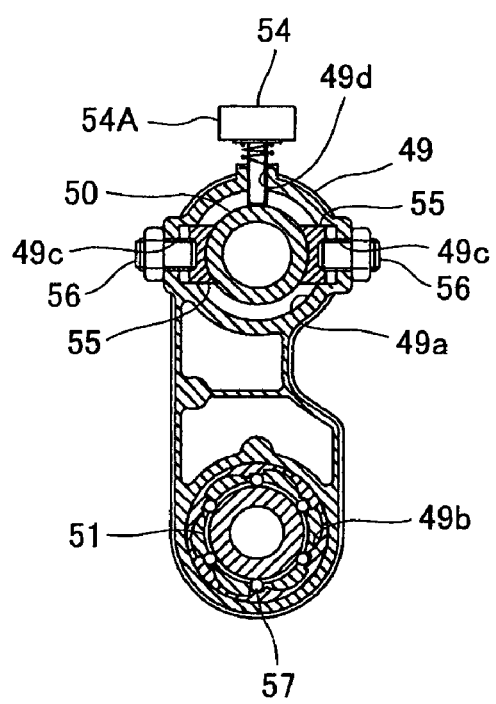
FIG. 15 is a cross-sectional view showing the pair of pipes and a first slide support part to move the cutting part of the miter saw in a direction substantially perpendicular to a pivot shaft.

The support member 40 extends obliquely from a center part in the rightward and leftward directions of the miter saw 1 toward the upper right thereof, thereby forming a first holder part, as shown in FIG. 3. A first slide support part 49 is provided at an extended end of the support member 40. Two through holes 49a and 49b oriented in the frontward and rearward directions are formed in the first slide support part 49, as shown in FIGS. 2, 14, and 15. The through holes 49a and 49b each have a substantially circular cross-section in a plane perpendicular to the frontward and rearward directions. Two hollow pipes 50 and 51 penetrate the through holes respectively.

Figure 18:
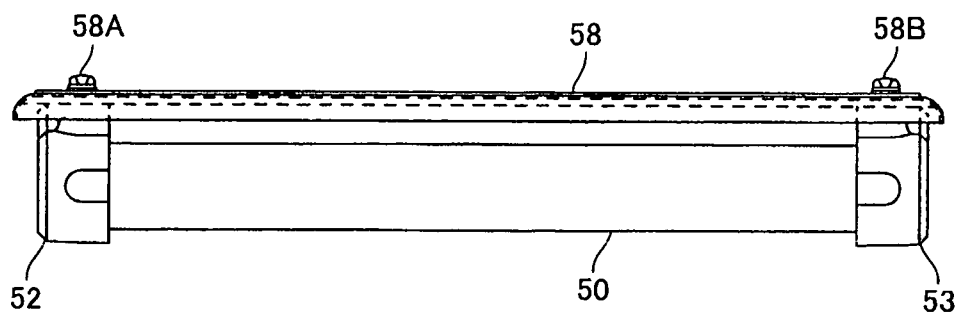
FIG. 18 is a plan view showing a state where the cover is attached to a first end holder member and a second end holder member which support both ends of the pair of pipes in the miter saw.

As shown in FIGS. 14 and 18, one ends of the two pipes 50 and 51 are covered with and held by a second end holder member 53 described later. The other ends of the pipes are covered with and held by a first end holder member 52. Thus, the pipes 50 and 51 are provided substantially in parallel with each other, thereby forming a pair. A virtual plane including the axes of the pair of pipes 50 and 51 is set in a positional relationship of being substantially perpendicular to the pivotal shaft 32 of the cutting part 30 described later, which is provided extending in the rightward and leftward directions of FIG. 3. The pipes 50, 51 penetrate through holes 33a and 33b of a second slide support part 33 described later, with the one ends of the pipes 50 and 51 being closer to the second slide support part 33. The pipes 50, 51 also penetrate through holes 49a and 49b of a first slide support part 49, with the other ends of the pipes 50, 51 being closer to the first slide support part 49.

The outer diameters of the pipes 50 and 51 are smaller than the inner diameters of the through holes 49a and 49b, respectively. The pair of pipes 50 and 51 are slidable in axial directions thereof in the through holes 49a and 49b, respectively. The directions in which the through holes 49a and 49b are oriented, i.e., the slide directions of the pipes 50 and 51 correspond to the direction substantially perpendicular to the pivotal shaft 32, as described later. On the end part side opposite to the end part side where the pipes 50 and 51 penetrate the first slide support part 49, the cutting part 30 is supported by the pipes 50 and 51 through the second slide support part 33, as will be described later.

In other words, the pair of pipes 50 and 51 support the cutting part 30 on one end side thereof, and are positioned parallel to each other. The pair of pipes 50 and 51 is supported slidably by the first slide support part 49 on the other end side thereof with parts of a side face thereof being covered with the first slide support part 49. The through holes 49a and 49b are provided extending perpendicularly in upward and downward directions. Therefore, as described above, the virtual plane including the axes of the pair of pipes 50 and 51 is positioned substantially parallel to the pivot direction of the cutting part 30 described later. Since the pair of pipes 50 and 51 slide relative to the first slide support part 49, the disc saw blade 31 can be moved in the direction substantially perpendicular to the pivotal shaft 32 described later.

As shown in FIG. 15, in parts of the first slide support part 49 where the through hole 49a is formed, a pair of through holes 49c are formed substantially in parallel with the pivotal shaft 32 of the cutting part 30 in the diameter direction of the through hole 49a. At the uppermost part of the first slide support part 49 in the perpendicular direction, a through hole 49d is formed perpendicularly from upside toward downside, i.e., in a direction substantially perpendicular to the pivotal shaft 32 in the virtual plane including the axes of the pair of pipes 50 and 51. A female thread is formed in each of the through holes 49c and 49d. A first screw 54 is screwed in the female thread of the through hole 49d.

A first knob 54A is provided at an end of the first screw 54. As the operator of the miter saw 1 rotates the first knob 54A, the first screw 54 can be screwed back and forth in the directions substantially perpendicular to the pivotal shaft 32, in the virtual plane including the axes of the pair of pipes 50 and 51. As shown in FIG. 15, the other end opposite to the one end of the first screw 54 where the first knob 54A is provided is capable of contacting the pipe 50 in the through hole 49a. By pressing the pipe 50 by the other end of the screw 54, the other end of the screw 54 can be engaged with the pipe 50 so as to restrict slide of the pipe 50 relative to the first slide support part 49.

As shown in FIG. 15, a pair of slide members 55 are provided at positions near the through holes 49c in the through hole 49a between the first slide support part 49 and the pipe 50. The pair of slide members 55 are held by a pair of left and right bolts 56 screwed in the through holes 49c. By rotating the bolts 56 to adjust the positions of the slide members 55, the position of the pipe 50 in the rightward and leftward directions in FIG. 15 within the through hole 49a can be finely adjusted. Accordingly, the inclination angle of the disc saw blade 31 relative to the upper surface 21A of the turntable 21 can be finely adjusted.

For example, when the bolts 56 are rotated to move the pair of slide members 55 in the leftward direction in FIG. 15, the second slide support part 33 tilts in the leftward direction in FIG. 3 (also the leftward direction in FIG. 16) about the pipe 51 as a fulcrum. Accordingly, the cutting part 30 supported by the second slide support part 33 tilts in the same direction about the pipe 51 as a fulcrum.

Between the first slide support part 49 and the pipe 51 in the through hole 49*b*, a ball bearing 57 is inserted as shown in FIG. 15. The ball bearing 57 smoothens slide of the pipe 51 relative to the first slide support part 49, and regulates movement of the pipe 51 in the radial direction of the through hole 49*b* in the through hole 49*b*. Therefore, the pipe 51 cannot move in the radial direction of the through hole 49*b* within the through hole 49*b*.

Figure 4:
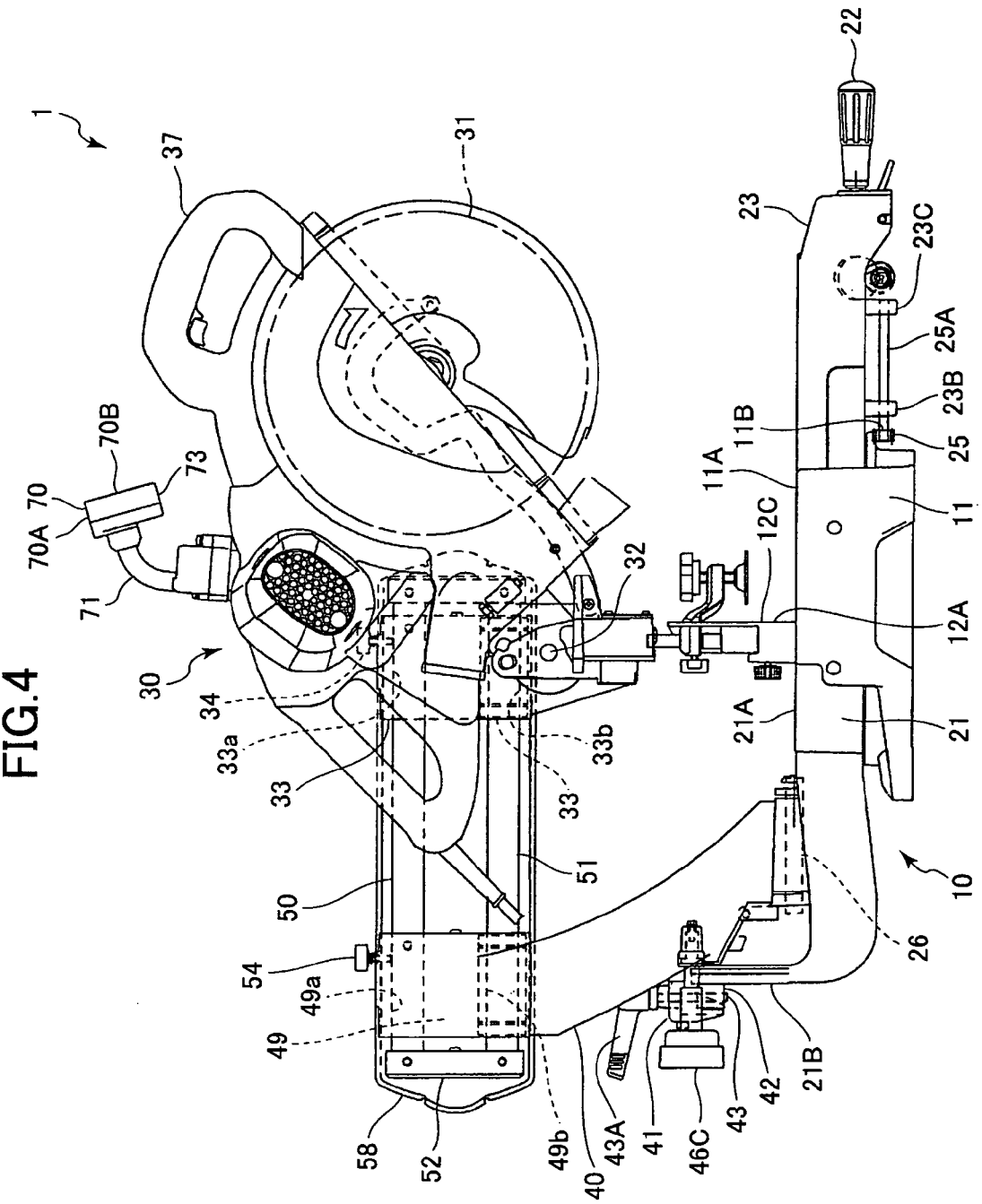
FIG. 4 is a left side view showing a state where the cutting part of the miter saw is positioned at the forefront position.
Figure 5:
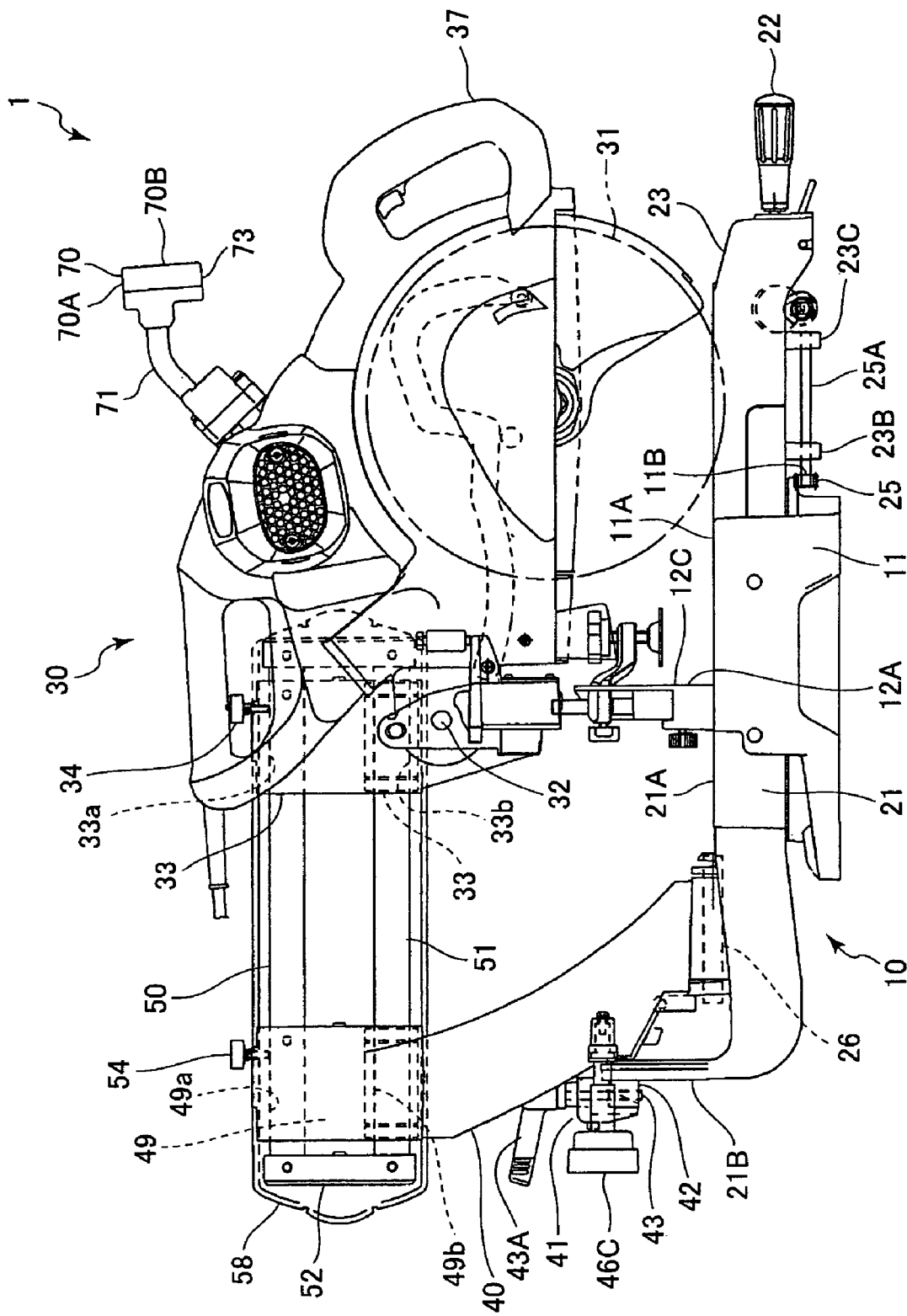
FIG. 5 is a left side view showing a state where the cutting part of the miter saw is positioned at the forefront position.
Figure 16:
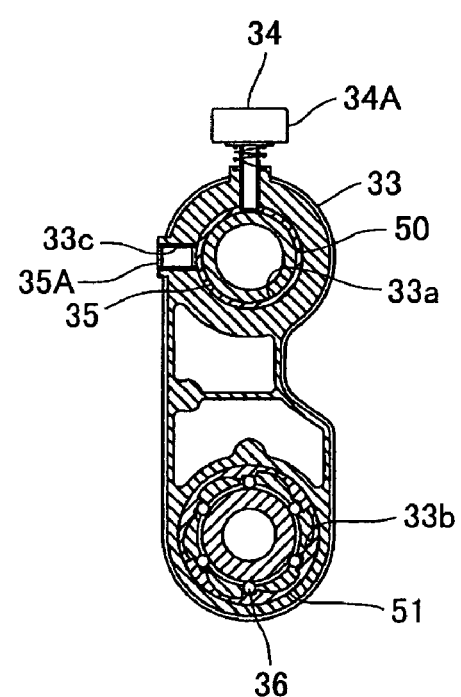
FIG. 16 is a cross-sectional view showing the pair of pipes and a second slide support part to move the cutting part of the miter saw in a direction substantially perpendicular to a pivot shaft.
Figure 17A:
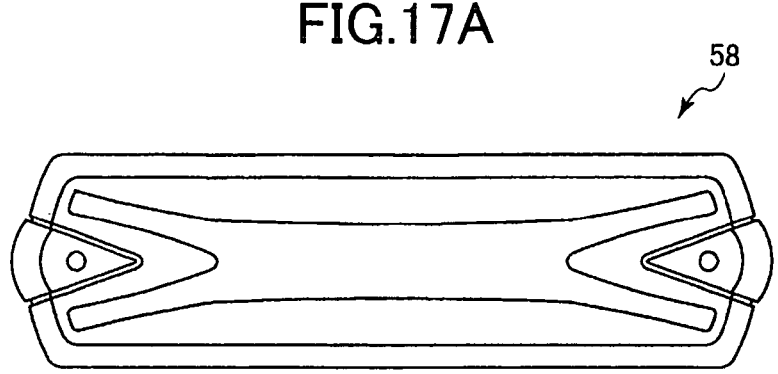
FIG. 17A is a right side view showing a cover of the miter saw according to the embodiment of the present invention.
Figure 17B:
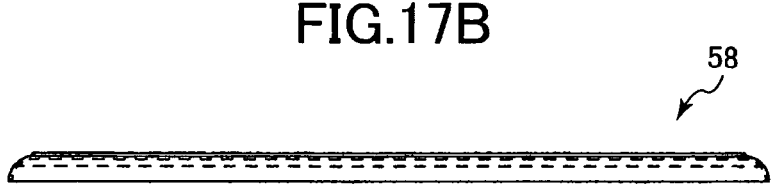
FIG. 17B is a plan view of the cover of FIG. 17A.
Figure 17C:
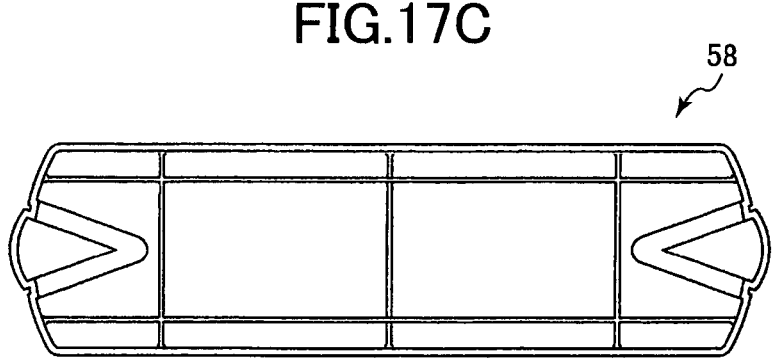
FIG. 17C is a left side view the cover of FIG. 17A.

As shown in FIGS. 4 and 5, the cutting part 30 including the disc saw blade 31 has the pivotal shaft 32 positioned in parallel with the rotation shaft 31A (FIG. 3) of the disc saw blade 31 described later. The cutting part 30 includes a second holder part including the second slide support part 33 at one end side thereof with respect to the pivotal shaft 32 as a boundary, and includes the disc saw blade 31 on the other end side. As shown in FIGS. 2, 14, and 16, like the first slide support part 49, two through holes 33*a* and 33*b* oriented in the frontward and rearward directions are formed in the second slide support part 33.

As shown in FIG. 16, the through holes 33*a* and 33*b* have substantially circular cross-sections in a plane perpendicular to the frontward and rearward directions. The pair of pipes 50 and 51 each penetrate these through holes. Each of the outer diameters of the pipes 50 and 51 are smaller than the inner diameters of the through holes 33*a* and 33*b*. The pair of pipes 50 and 51 are slidable within the through holes 33*a* and 33*b* in axial directions of these holes, respectively. The directions in which the through holes 33*a* and 33*b* are oriented, i.e., the slide directions of the pipes 50 and 51 correspond to a direction substantially perpendicular to the pivotal shaft 32.

The pair of pipes 50 and 51 support the cutting part 30 through the second slide support part 33 on one end side thereof. The through holes 33*a* and 33*b* are provided upwards and downwards in the perpendicular direction, respectively. The virtual plane including the axes of the pipes 50 and 51 is set positioned substantially parallel to the swing direction of the disc saw blade 31. As the second slide support part 33 slides relative to the pair of pipes 50 and 51, the disc saw blade 31 can slide in directions substantially perpendicular to the pivotal shaft 32.

As shown in FIG. 16, in the part of the second slide support part 33 where the through hole 33*a* is formed, a through hole 33*c* is formed substantially in parallel with the pivotal shaft 32 of the cutting part 30 from the left side of the through hole 33*a* to the axis of the pipe 50. At the uppermost part of the second slide support part 33 in the perpendicular direction, a through hole 33*d* is formed perpendicularly from upside to downside, i.e., in a direction substantially perpendicular to the pivotal shaft 32, in the virtual plane including the axes of the pair of pipes 50 and 51.

Female threads are cut in the through holes 33*c* and 33*d*, respectively. A second screw 34 is screwed in the female screw of the through hole 33*d*. A second knob 34A is provided at one end of the second screw 34. As the operator of the miter saw 1 rotates the second knob 34A, the second screw 34 can be screwed back and forth in the direction substantially perpendicular to the pivotal shaft 32 in the virtual plane including the axes of the pair of pipes 50 and 51. As shown in FIG. 16, the other end of the second screw 34 opposite to the one end where the second knob 34A is provided is capable of contacting the pipe 50 within the through hole 33. By pressing the pipe 50 with the other end of the screw 34, the other end of the screw 34 is engaged with the pipe 50 so as to regulate slide of the second slide support part 33 relative to the pipe 50.

As shown in FIG. 16, a slide bearing ring 35 is inserted in the through hole 33*a* between the second slide support part 33 and the pipe 50. The slide bearing ring 35 is held by a screw member 35A to be screwed in the through hole 33*c*, and the pipe 50 is configured to be movable in the radial direction of the through hole 33*a* within the through hole 33*a* by the slide bearing ring 35. Also as shown in FIG. 16, a ball bearing 36 is inserted between the second slide support part 33 and the pipe 51 in the through hole 33*b*, and allows the pipe 51 to slide smoothly on the second slide support part 33. At the same time, the ball bearing 36 regulates movement of the pipes 50 and 51 in the radial direction of the through hole 33*b* within the through hole 33*b*.

Thus, in the second slide support part 33, the pipes 50 and 51 are not movable in the radial directions of the through holes 33*a* and 33*b*. In addition, in the first slide support part 49, the pipe 51 is not movable in the radial direction of the through hole 49*b* therein while the pipe 50 in the through hole 49*a* of the first slide support part 49 is movable in the radial direction of the through hole 49*a*. Therefore, as described previously, fine adjustment of the positions of the pipe 50 in the rightward and leftward directions in the through hole 49*a* in FIG. 15 is made by rotating the bolts 56, 56 (FIG. 15) of the first slide support part 49 to adjust the positions of the slide members 55 in the radial direction of the through hole 49*a*. In this way, the second slide support part 33 is tilted about the pipe 51 as a fulcrum. Accordingly, the tilt angle of the disc saw blade 31 is finely adjusted relative to the upper surface 21A of the turntable 21.

The direction of the pipe 50 which is deformed due to pressing on the pipe 50 by the first and second screws 54 and 34 can be made identical to the pivotal direction of the disc saw blade 31, i.e., the direction substantially perpendicular to the pivotal shaft 32. Therefore, deformation of the pipe 50 does not influence perpendicularity of the disc saw blade 31 to the upper surface 21A of the turntable 21. Thus, deterioration of the perpendicularity of the disc saw blade 31 to the upper surface 21A of the turntable 21 can be prevented. In addition, since the first and second engagement members are constituted by the first and second screws 54 and 34, the structures of the first and second engagement members can be simplified, respectively.

The first end holder member 52 and the second end holder member 53 (FIG. 14) which hold two ends of each of the pair of pipes 50 and 51 are provided with a substantially plate-like cover 58, as shown in FIGS. 1, 17A-17C, and 18. As shown in FIGS. 3 and 18, the cover 58 is positioned to be bridged between the first end holder member 52 and the second end holder member 53 substantially parallel to the virtual plane including the axes of the pair of pipes 50 and 51. An end part of the cover 58 positioned at a rear part thereof is fixed to the first end holder member 52 by a screw 58A. The other end part of the cover 58 positioned at a front part thereof is fixed to the second end holder member 53 by a screw 58B. In FIG. 18, the upper side of this figure corresponds to the right side of FIG. 3. On the right side face of the cover 58, the name of the manufacturer of the miter saw 1, and an advertising message can be written large enough to be recognized at a glance.

Since the cover 58 is provided on the right side of the pair of pipes 50 and 51, which corresponds to the outer side face of the miter saw 1, the pair of pipes 50 and 51 can be protected so that anything else might not collide with the pair of pipes 50 and 51 by mistake. Further, a lubrication oil may be applied to the pair of pipes 50 and 51 in some cases. Even in these cases, the pair of pipes 50 and 51 applied with the lubrication oil can be prevented from being touched by the operator of the miter saw 1. The cover 58 is omitted from FIGS. 7, 8, 14, 15, and 16 for descriptive conveniences.

The disc saw blade 31 is supported to be rotatable about the rotation shaft 31A (FIG. 3) as a center in the cutting part 30. As shown in FIG. 1, at an upper part of the cutting part 30, a handle 37 is provided. The structure is arranged such that the operator of the miter saw 1 can pivot the cutting part 30 about the pivotal shaft 32, gripping the handle 37. The cutting part 30 is constantly urged upwards by a return spring.

Therefore, when the cutting part 30 is not pressed downwards by the operator of the miter saw 1 during a non-cutting period, the cutting part 30 is positioned highest in the perpendicular direction by a stopper mechanism, as shown in FIGS. 1 and 2. The cutting part 30 is provided with a power supply and a motor. The disc saw blade 31 is configured to be rotated by drive force of the motor which is supplied with and driven by electric power from the power supply.

As shown in FIG. 1, the cutting part 30 is provided with a display unit 70. The display unit 70 is supported by a flexible arm 71, at an upper part of the cutting part 30 and at a position behind the handle 37. An end of the flexible arm 71 is fixed to the cutting part 30, and the other end thereof is fixed to the display unit 70. The display unit 70 can tilt and move in all directions, i.e., frontwards, rearwards, rightwards, leftwards, upwards, and downwards relative to the cutting part 30.

Figure 19A:
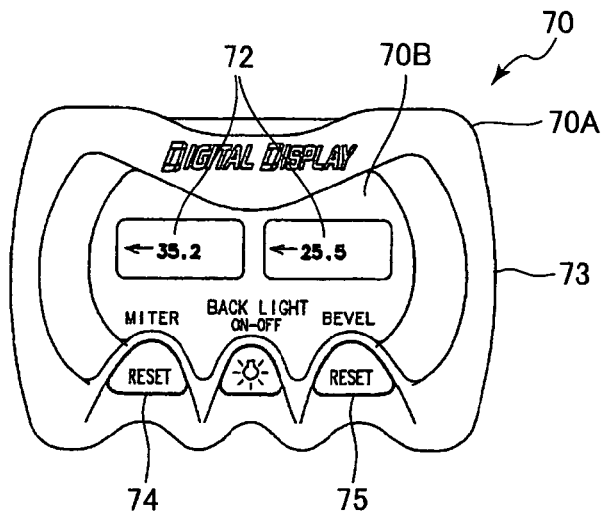
FIG. 19A is a plan view showing a display unit of the miter saw.
Figure 19B:
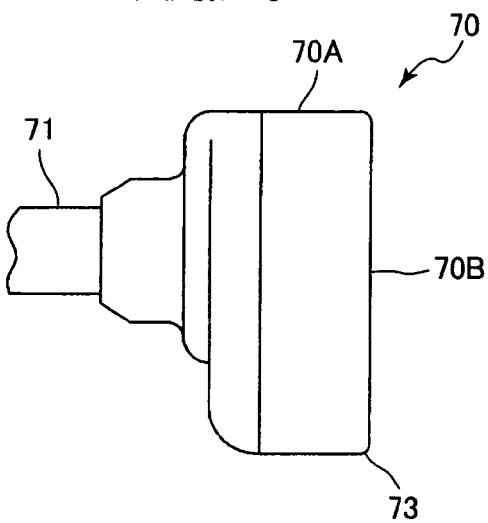
FIG. 19B is a left side view of the display unit of FIG. 19A.

The display unit 70 has an outer frame 70A. The outer frame 70A contains a display portion 73 and a board on which a microcomputer, and a storage unit are mounted. As the display portion 73, for example, a liquid crystal display part having a liquid crystal display panel as a display surface 72 (FIG. 19A) is used. To the microcomputer, signals can be inputted from the pivot angle detection unit 81 and the tilt angle detection unit 82. Based on these signals, a pivot angle and a tilt angle are calculated, respectively. Signals are outputted to the display portion 73 so that a tilt-indication angle and a pivot-indication angle each can be displayed on the display surface 72 of the display portion 73. The storage unit is configured to store tilt angles and pivot angles as calculation results calculated by the microcomputer. The display surface 72 of the display unit 70 can display the tilt angle and the pivot angle in one line, as shown in FIG. 19A. The display surface 72 is covered with a transparent cover 70B forming part of the outer frame 70A. Since the display unit 70 can be tilted and moved in all directions, i.e., frontwards, rearwards, rightwards, leftwards, upwards, and downwards relative to the cutting part 30 by the flexible arm 71. Therefore, the normal of the display surface 72 provided in the display unit 70 is variable relative to the cutting part 30.

An inclination mark (BEVEL) and a pivot mark (MITER) are written, respectively at portions corresponding to the display parts of the tilt angle and the pivot angle on the outer frame 70A near the display surface 72 of the display portion 73. Therefore, there is no need for any other optional display than these angles, in order to distinguish the two kinds of angles, i.e., the tilt angle and the pivot angle displayed on the display surface 72. Only the values of tilt and pivot angles are displayed in the line. Accordingly, the display portion 73 can be downsized.

As shown in FIG. 19A, two reset buttons 74 and 75 as reset switches are provided on the outer frame 70A of the display portion 73 near the display surface 72. The reset buttons are configured such that the tilt and pivot angles displayed on the display portion 73 can be reset independently from each other. When the reset button 74 or 75 is pressed down to turn on a reset switch, a reset signal is outputted to the microcomputer. The microcomputer is configured such that the tilt angle indication and the pivot angle indication can be set to 0°, respectively, when the reset buttons 74 and 75 are turned on.

Figure 8:
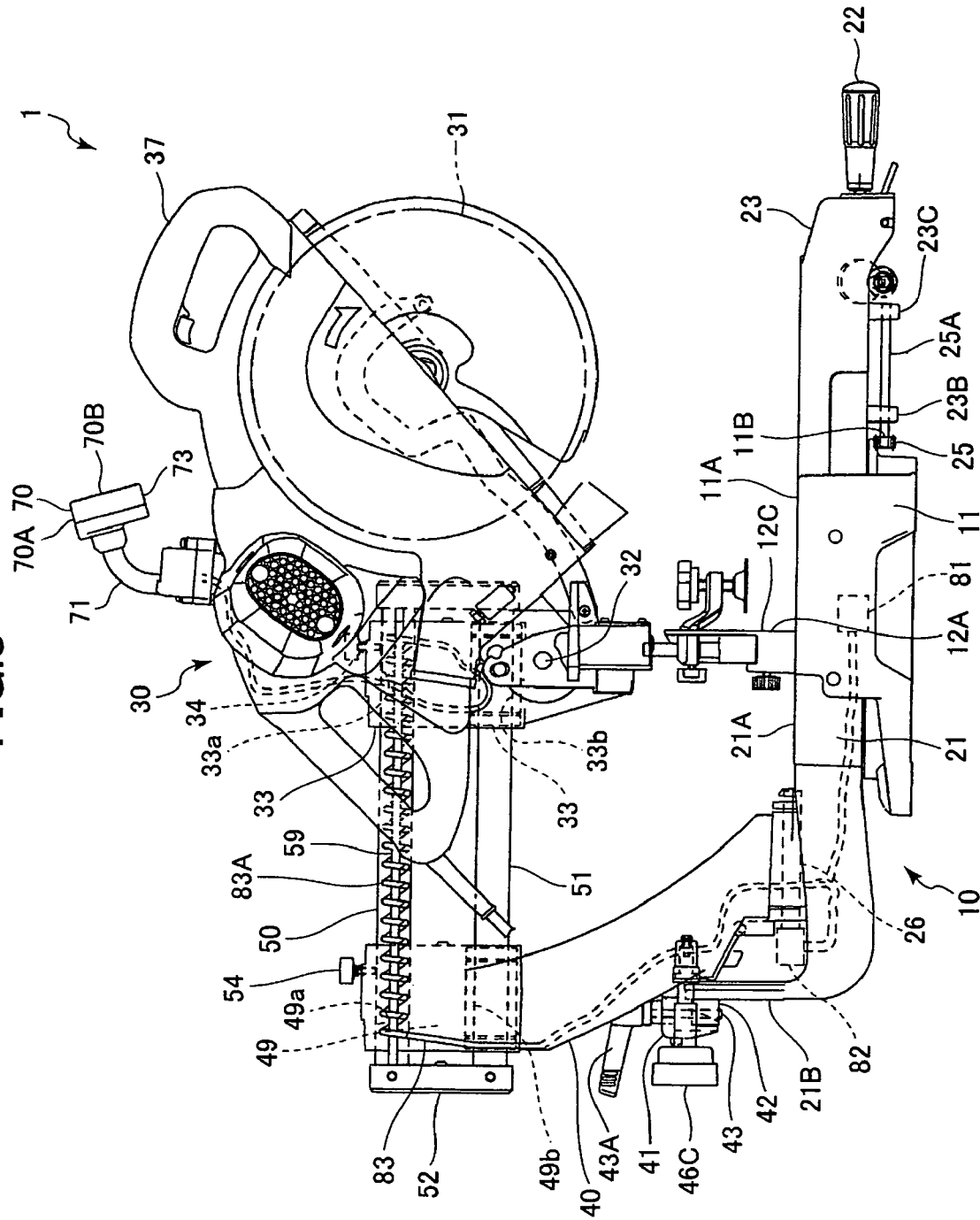
FIG. 8 is a left side view showing a state where the cutting part of the miter saw is positioned at the forefront position.

As shown in FIG. 8, the pivot angle detection unit 81 and the tilt angle detection unit 82 provided on the base part 10 are electrically connected to the microcomputer provided in the cutting part 30 by a cord 83. The cord 83 extends inside the support member 40 from the pivot angle detection unit 81 and tilt angle detection unit 82 of the base part 10 to the outside of the first slide support part 49, and further extends on the left side of the first slide support part 49. The cord 83 then passes on the left side of the pair of pipes 50 and 51, and enters into the cutting part 30. The cord 83 further extends inside the cutting part 30, and enters into the display unit 70, via the flexible arm 71. The cord 83 is then connected to the microcomputer. Note that the cord 83 is omitted from FIGS. 1 to 6, 9, 11, 12, and 14 for descriptive conveniences.

Such a part of the cord 83 that is positioned on the left side of the pair of pipes 50 and 51 is made from a curled cord 83A. As shown in FIGS. 7 and 8, a support rod 59 is arranged substantially in parallel with the pipe 50, on the left side of the pipe 50. Two ends of the support rod 59 are fixed to the first end holder member 52 and the second end holder member 53, respectively. The curled cord 83A is supported, wound around the support rod 59. As the pair of pipes 50 and 51 slide relative to the first slide support part 49, or the second slide support part 33 slides relative to the pair of pipes 50 and 51, the distance between the cutting part 30 and the support member 40 is shortened. Then, the length of the curled cord 83A in the axial direction of the support rod 59 is shortened as shown in FIG. 7. On the other side, as the distance between the cutting part 30 and the support member 40 is elongated, the length of the curled cord 83A in the axial direction of the support rod 59 is elongated as shown in FIG. 8.

The microcomputer is mounted on a board, and the display portion 73 and the board therefor are provided in the cutting part 30. Therefore, signals indicative of a pivot angle and a tilt angle outputted from the pivot angle detection unit 81 and the tilt angle detection unit 82 of the base part 10 can be standardized in common with other models. In this way, the display portion 73 provided on a miter saw 1 can be replaced with another display means provided on another model. Alternatively, design can be changed such that the display portion 73 provided on a miter saw 1 can be attached to another model.

A part of the cord 83 at positions of the pair of pipes 50 and 51 is made from a curled cord 83A. Therefore, when the cutting part 30 moves in a direction perpendicular to the pivotal shaft 32, the curled cede cord 83A expands or contracts. Accordingly, the microcomputer and the pivot angle detection unit 81 of the base part 10 can be electrically connected to each other, without hindering movement of the cutting part 30.

To make fine adjustment of the pivot angle for cutting a workpiece carried on the turntable 21 at a desired angle, the knob 22 (FIG. 13) is firstly screwed back to the outside in a radial direction of the turntable 21, thereby making the other end of the knob shaft 22A apart from the arc part of the base 11. In this way, the turntable 21 is made rotatable. Secondly, the operator of the miter saw 1 grips the knob 22 and pivots the turntable 21 in proximity to a desired pivot angle. Next, the knob 24B is rotated to finely adjust the pivot angle of the turntable 21 to the desired pivot angle. Finally, the knob 22 is screwed forth in the radial direction of the turntable 21. Accordingly, the other end of the knob shaft 22A opposite to the one end where the knob 22 is provided is pressed directly against the arc part provided integrally with the base 11, thereby restricting pivot of the turntable 21. Then, the workpiece is cut by the disc saw blade 31.

To make fine adjustment of the tilt angle for cutting a workpiece with the disc saw blade 31 tilted to a predetermined angle, the clamp lever 43A (FIG. 1) is firstly loosened, thereby releasing tilt lock of the support member 40 and the cutting part 30. Secondly, the operator of the miter saw 1 grips the handle 37 and tilts the support member 40 and cutting part 30 in proximity to a desired tilt angle. Next, the knob 46C (FIG. 11) is rotated to finely adjust the tilt angle of the support member 40 and the cutting part 30 to the desired tilt angle. Finally, tilt of the support member 40 and the cutting part 30 is locked by tightening the clamp lever 43A (FIG. 1). Then, the workpiece is cut by the disc saw blade 31.

When the workpiece (wood) having a small width is cut at right angles to the upper surface 21A of the turntable 21, the pair of pipes 50 and 51 are moved frontwards until the first end holder member 52 contacts the first slide support part 49 of the support member 40. Thereafter, the first knob 54A of the first screw 54 is rotated to regulate slide of the pipe 50 relative to the first slide support part 49. In addition, as shown in FIG. 2, the second slide support part 33 is moved rearwards along the pair of pipes 50 and 51 until the second slide support part 33 contacts the first slide support part 49. The second knob 34A of the second screw 34 is rotated to regulate slide of the second slide support part 33 relative to the pipe 50. As a result, the support member 40, the second slide support part 33 and cutting part 30 are held perpendicularly standing as shown in FIG. 3. In this state, the cutting part 30 is pivoted about the pivotal shaft 32 as a center, so that the workpiece having the small width (wood) can be cut at right angles to the upper surface 21A of the turntable 21.

Figure 6:
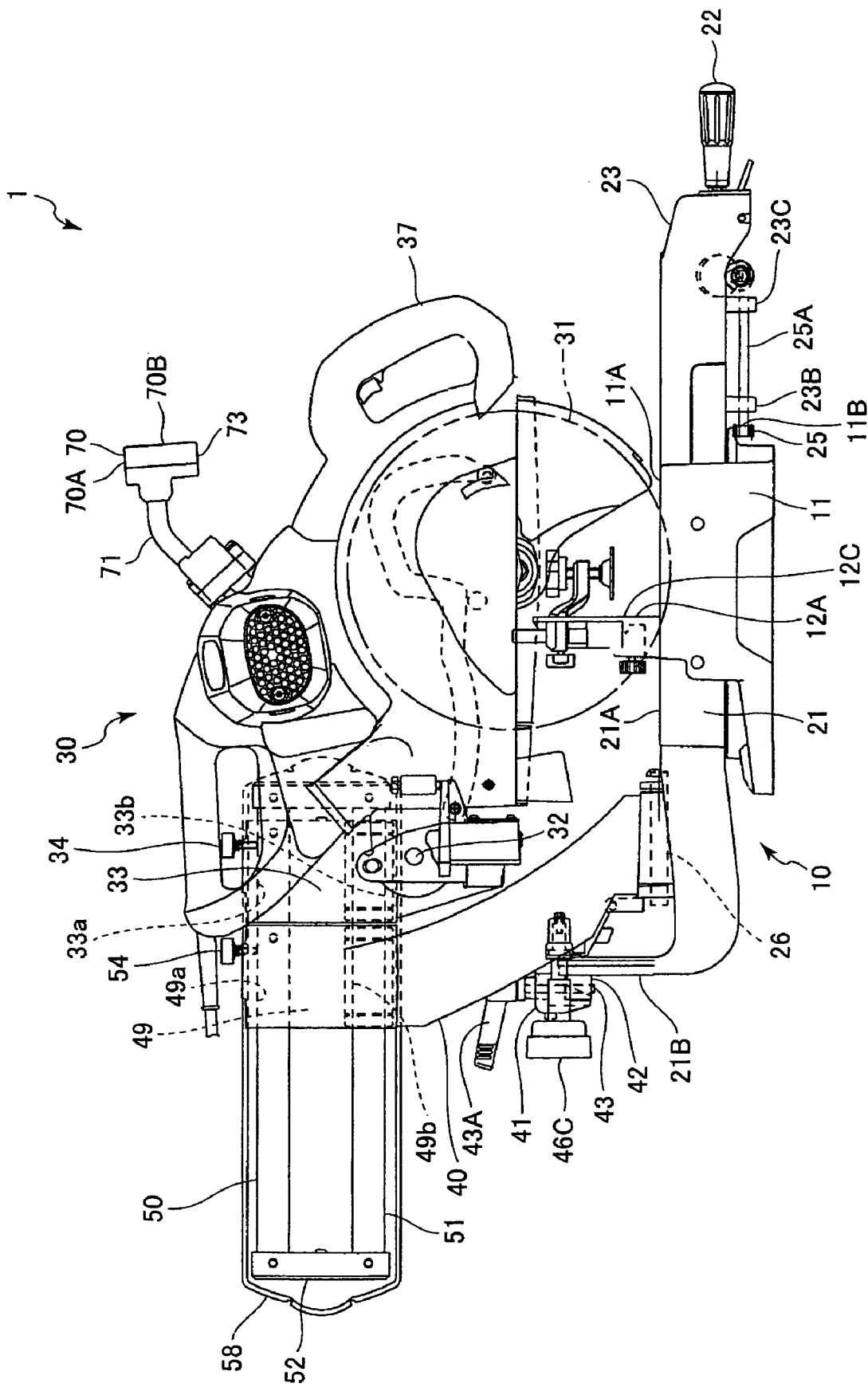
FIG. 6 is a left side view showing a state where the cutting part of the miter saw is positioned at the backmost position with the cutting part being in a lower position.

Another method will be as follows. The pair of pipes 50 and 51 is moved rearwards until the second end holder member 53 contacts the second slide support part 33 of the cutting part 30. Thereafter, the second knob 34A of the second screw 34 is rotated to regulate slide of the second slide support part 33 relative to the pipe 50. In addition, as shown in FIG. 6, the pair of pipes 50 and 51 are moved rearwards until the first slide support part 49 and the second slide support part 33 contact with each other. The first knob 54A of the first screw 54 is rotated to regulate slide of the pipe 50 relative to the first slide support part 49. As a result, the support member 40, the second slide support part 33 and cutting part 30 are held standing perpendicularly as shown in FIG. 3. In this state, the cutting part 30 is pivoted about the pivotal shaft 32 as a center. The workpiece (wood) having the small width can be cut at right angles to the upper surface 21A of the turntable 21.

When a workpiece (wood) having the large width is cut at right angles to the upper surface 21A of the turntable 21, the pair of pipes 50 and 51 are moved frontwards until the first end holder member 52 contacts the first slide support part 49 of the support member 40. Thereafter, the first knob 54A of the first screw 54 is rotated to regulate slide of the pipe 50 relative to the first slide support part 49. In addition, the second knob 34A of the second screw 34 is rotated to allow the second slide support part 33 to slide relative to the pipes 50, 51. Further, as shown in FIG. 4, the second slide support part 33 is moved frontwards along the pair of pipes 50 and 51 until the part 33 contacts the second end holder member 53. Then, while the disc saw blade 31 is driven to rotate, the handle 37 is pushed down to pivot downwards the cutting part 30 about the pivotal shaft 32 as a center, as shown in FIG. 5, against the elastic force of the spring.

By gripping the handle 37, the cutting part 30 and the second slide support part 33 are moved rearwards along the axial directions of the pipes 50 and 51 perpendicularly to the pivotal shaft 32. The workpiece (wood) having the large width can be cut at right angles to the upper surface 21A of the turntable 21. When the force pushing down the handle 37 is released after cutting the workpiece, the cutting part 30 pivots upwards about the pivotal shaft 32 as a center by the elastic force of the spring, and returns to the original position of the part 30 before the handle 37 is pushed down. If the same operation as described above is repeated, workpieces can be sequentially cut one by one. Angled cutting, inclined cutting, and composite cutting of a workpiece can be carried out in a similar manner.

If there is no obstacle such as a wall or an object behind the support member 40, the workpiece (wood) having the large width can be cut in the following manner. The first knob 54A of the first screw 54 is rotated to release regulation of slide of the pipe 50 relative to the first slide support part 49. The first end holder member 52 is moved frontwards along the pair of pipes 50 and 51 until the first end holder member 52 contacts the first slide support part 49. The second knob 34A of the second screw 34 is rotated to allow the second slide support part 33 to slide relative to the pipe 50. The second slide support part 33 is moved frontwards along the pair of pipes 50 and 51 until the part 33 contacts the second end holder member 53. Thereafter, the second knob 34A of the second screw 34 is rotated to regulate slide of the pipe 50 relative to the second slide support part 33. Further, while the disc saw blade 31 is driven to rotate, the handle 37 is pushed down to pivot the cutting part 30 about the pivotal shaft 32 as a center, against the elastic force of the spring.

In this state, by gripping the handle 37, the cutting part 30 and the pair of pipes 50 and 51 are moved rearwards along the axial directions of the pipes 50 and 51 perpendicularly to the pivotal shaft 32. The workpiece (wood) having the large width can be cut at right angles to the upper surface 21A of the turntable 21. When the force pushing down the handle 37 is released after cutting the workpiece, the cutting part 30 pivots upwards about the pivotal shaft 32 as a center, and returns to the original position of the part 30 prior to being pushed down by the handle 37. If the same operation as described above is repeated, workpieces can be sequentially cut one by one. Angled cutting, inclined cutting, and composite cutting of a workpiece can be carried out in a similar manner.

The miter saw 1 has a structure as described above in which a workpiece is cut by moving the cutting part 30 perpendicularly to the pivotal shaft 32. When this miter saw 1 is set in the state before cutting a workpiece, as shown in FIG. 4, the cutting part 30 is situated just in front of the operator of the miter saw 1. At this time, visibility of display such as a pivot angle and a tilt angle can be improved because the display portion 73 is provided on the cutting part 30 situated just in front of the operator. Further, the display portion 73 is supported by the flexible arm 71 and is therefore tiltable and movable in all directions, i.e., frontwards, rearwards, rightwards, leftwards, upwards, and downwards relative to the cutting part 30. Hence, the normal direction of the display surface 72 can be oriented in a direction to the operator of the miter saw 1. Therefore, visibility of display such as a pivot angle and a tilt angle of the display surface 72 can be improved.

Figure 20:
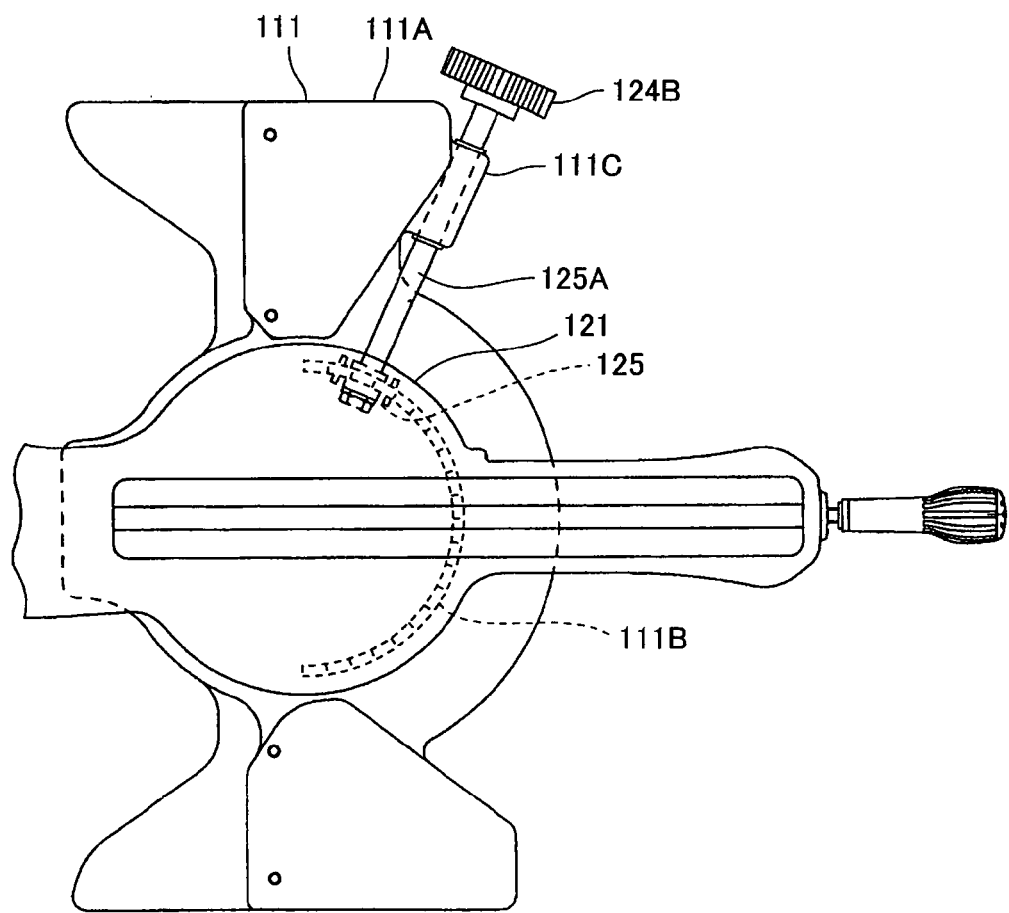
FIG. 20 is a conceptual plan view showing a second embodiment of a pivot fine-adjustment device of the miter saw.
Figure 21:
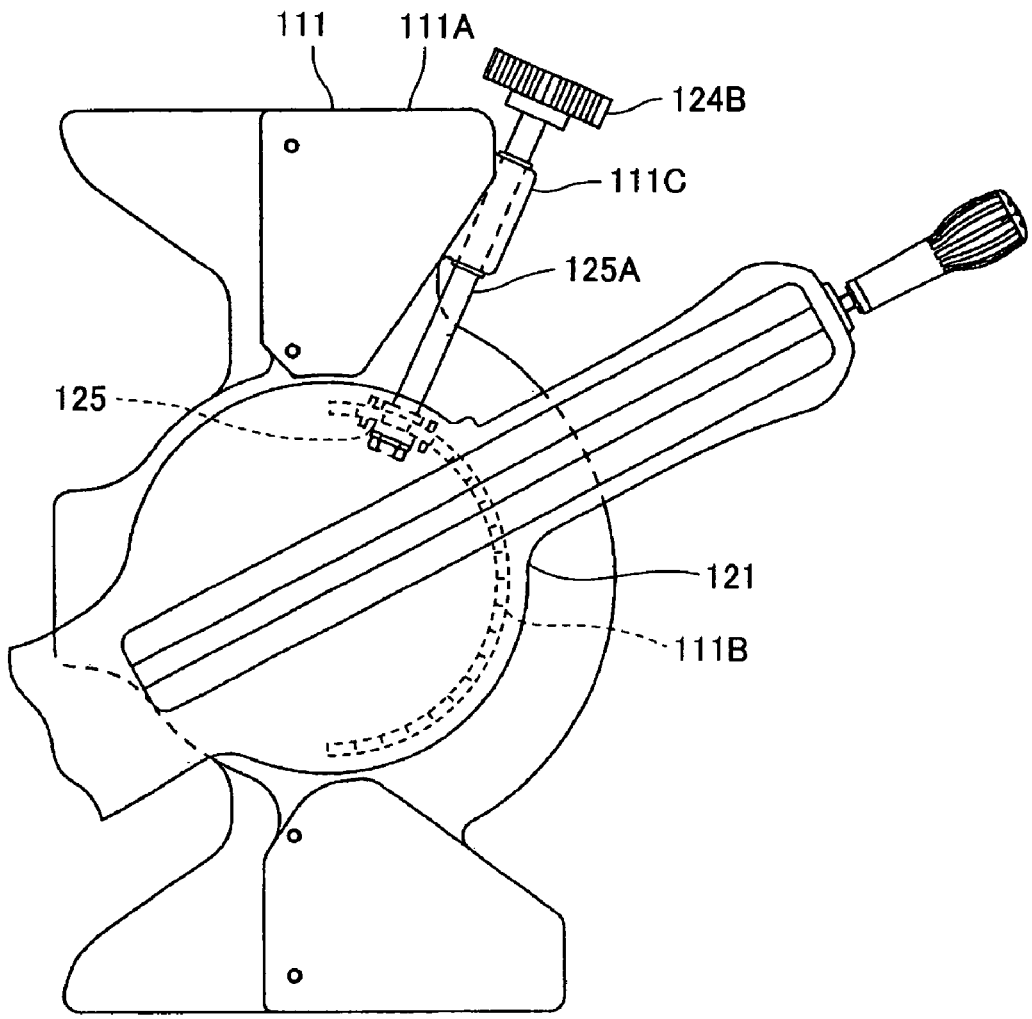
FIG. 21 is a conceptual plan view showing a third embodiment of a pivot fine-adjustment device of the miter saw.
Figure 22:
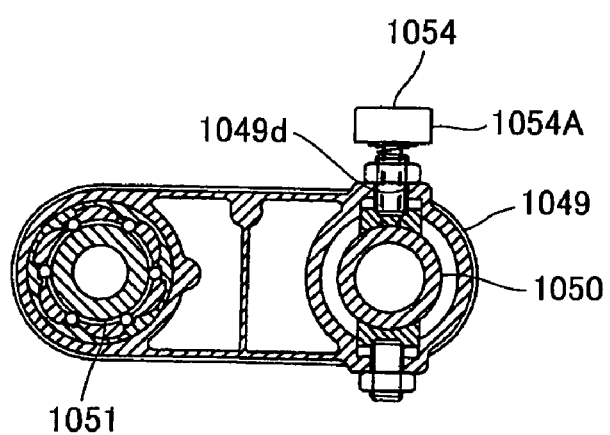
FIG. 22 is a cross-sectional view showing a pair of pipes and a slide support part to move a cutting part of a conventional miter saw in a direction substantially perpendicular to a pivot shaft thereof.

In the miter saw according to the present invention is not limited to the embodiment described above. Various modifications and improvements are available within the scope described in the claims. For example, in the pivot-angle adjustment device according to the present embodiment, the pinion 25 and the knob 24B are rotatably supported by the frame 23 of the turntable 21, and the tooth part 11B is provided at a peripheral part of the base 11. However, there may be an inverted structure as shown in FIGS. 20 and 21. That is, a pinion 125 and a knob 124B may be rotatably supported by the base 111, and a tooth part 111B may be provided substantially like an arc on a substantially peripheral part of the lower face of a table 121, along the pivot direction of the table 121.

A right base 111A constituting the base 111 is provided with a pinion shaft reception part 111C, as shown in FIG. 20. The pinion shaft reception part 111C receives a pinion shaft 125A having an end where the pinion 125 is provided and another end where the knob 124B is provided. The tooth part 111B is provided integrally on the turntable 121. The pinion 125 is constantly engaged with the tooth part 111B. As the knob 124B is rotated, the pinion 125 rotates integrally with the pinion shaft 125A. Accordingly, the table 121 pivots relative to the base 111, as shown in FIG. 21. Thus, the pivot angle of the table 121 can be adjusted. By adopting this structure, the knob 124B can be rotated constantly in conjunction with pivoting of the table 121 relative to the base 111. By rotating the knob 124B without temporarily fixing the table 121, the pivot angle of the table 121 can be adjusted finely.

Although potentiometers are used as the pivot angle detection unit 81 and the tilt angle detection unit 82, these means are not limited to potentiometers. For example, well-known rotary encoders which count the rotation angle can be used.

Referring to FIG. 10 again, at the first opposing part 21E of the turntable 21, the substantially plate-like tooth member 44 is provided and fixed. At a position of the support member 40 near the second opposing part 41A, the shaft part 46B having the pinion 46A at an end and the knob 46C at another end is provided. The member 44 and the shaft part 46B may be situated at inverted positions to each other. That is, a substantially plate-like member may be provided at and fixed to the second opposing part of the support member. At a position of the turntable near the first opposing part, a shaft part having a pinion at an end and a knob at another end may be provided. Further, the pinion need not be constituted to be integral with the knob through the shaft part. Instead, the pinion and the knob may be connected by driving.

In the present embodiment, the turntable 21 is pivotable, and the disc saw blade 31 is tiltable. There can be a modification in which the turntable is pivotable and the disc saw blade is not tiltable. In another modification, the turntable is not rotatable and the disc saw blade is tiltable.

The display unit 70 need not always have a structure including the display portion 73 and the board therefor. For example, an end of the flexible arm may be fixed to the cutting part. Another end thereof may be fixed to the display means. The display means may be tiltable and movable in all directions, i.e., frontwards, rearwards, rightwards, leftwards, upwards, and downwards relative to the cutting part.

The ball bearings 57 and 36 are inserted between the first slide support part 49 and the pipe 51 and between the second slide support part 33 and the pipe 51, respectively. The present invention is not limited to the ball bearings. For example, metal impregnated with oil may be used in place of the ball bearing in order to make the pipes slidable relative to the first slide support part.

Although both of the first slide support part 49 and the second slide support part 33 are included, the structure may be arranged as follows. Only one of the first slide support part and the second slide support part may be included, and the cutting part may be slidable in a direction substantially perpendicular to the pivotal shaft.

According to the miter saw of the present embodiment, the direction of one of the pipes that may be deformed due to pressing on the one of the pipes by the first engagement member such as the first screw 54 is identical to the pivotal direction of the cutting blade, i.e., a direction perpendicular to the pivotal shaft. Therefore, deformation of the pipe does not influence the perpendicularity of the cutting blade to the upper surface of the base part. Thus, deterioration in perpendicularity of the cutting blade to the upper surface of the base part can be prevented.

According to the miter saw of the present embodiment, the cutting blade can be pivoted relative to the base by pivoting the turntable relative to the base.

According to the miter saw of the present embodiment, the cutting part can be tilted together with the support part by tilting the support part.

According to the miter saw of the present embodiment, the structure of the first engagement member can be simplified.

According to the miter saw of the present embodiment, the cutting blade can be moved in the direction perpendicular to the pivotal shaft by sliding and moving the pair of pipes relative to the first slide support part. Therefore, workpieces can be processed without projecting the pair of pipes to the outside of the miter saw.

In addition, the second slide support part includes the second engagement member such as the second screw 34 which restricts slide of the pipes relative to the second slide support part by pressing the pipes in the direction perpendicular to the pivotal shaft on the virtual plane. Therefore, the direction of one of the pipes that is deformed due to pressing on the one of the pipes by the second engagement member is identical to the pivotal direction of the cutting blade, i.e., the direction perpendicular to the pivotal shaft. Therefore, deformation of the pipe does not influence the perpendicularity of the cutting blade to the upper surface of the base part. Thus, deterioration in perpendicularity of the cutting blade to the upper surface of the base part can be prevented.

According to the miter saw of the present embodiment, the structure of the second engagement member can be simplified.

According to the miter saw of the present embodiment, the cutting blade can be moved in the direction substantially perpendicular to the pivotal shaft by sliding and moving the slide support part relative to the pair of pipes. Therefore, workpieces can be processed without projecting the pair of pipes to the outside of the miter saw.

It is understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. A miter saw comprising:
   a base portion for supporting a workpiece;
   a support member supported by the base portion; and
   a cutting portion having a pivotal shaft, the cutting portion being pivotably supported by the support member about the pivotal shaft, the cutting portion having a circular saw blade to be pivotably moved to cut the workpiece; wherein
   the support member comprises a first slide support portion provided at a top end thereof, and a pair of pipes supported slidably by the first slide support portion to be movable in a direction perpendicular to the pivotal shaft, the pair of pipes pivotably supporting the cutting portion, the pair of pipes each have a longitudinal axis and being parallel to each other, the longitudinal axes of the pair of pipes are positioned so as to define a virtual plane which is parallel to a pivotal direction of the circular saw blade, the first slide support portion comprises a first engagement member that is contactable with one of the pair of pipes to press the one of the pair of pipes in a pressing direction lying on the virtual plane, thereby restricting a slide of the pair of pipes relative to the first slide support portion, the cutting portion comprises a second slide support portion to pivotably support the circular saw blade, the second slide support portion is slidable along the pair of pipes, and the second slide support portion comprises a second engagement member that is contactable with the one of the pair of pipes to press the one of the pair of pipes in either one of the pressing direction and another direction lying on the virtual plane, thereby restricting a slide of the pair of pipes relative to the second slide support portion.

2. The miter saw as claimed in claim 1, wherein the second engagement member comprises a second screw and a second knob provided at an end of the second screw, the second slide support portion comprises a second thread which extends in the direction perpendicular to the pivotal shaft, the second screw is screwed in the second thread hole to press the pipe in the direction lying on the virtual plane, thereby restricting the slide of the pipes relative to the second slide support portion.

* * * * *